(12) United States Patent
Fuji

(10) Patent No.: US 8,004,537 B2
(45) Date of Patent: Aug. 23, 2011

(54) APPARATUS, METHOD, AND PROGRAM PRODUCT FOR COLOR CORRECTION

(75) Inventor: Kazuhiro Fuji, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 921 days.

(21) Appl. No.: 11/715,460

(22) Filed: Mar. 8, 2007

(65) Prior Publication Data

US 2007/0211315 A1    Sep. 13, 2007

(30) Foreign Application Priority Data

Mar. 9, 2006    (JP) ................. 2006-064111

(51) Int. Cl.
*G09G 5/02*    (2006.01)
(52) U.S. Cl. ......... 345/589; 345/590; 345/591; 345/603
(58) Field of Classification Search ........................ None
See application file for complete search history.

(56) References Cited

U.S. PATENT DOCUMENTS

| | | | |
|---|---|---|---|
| 6,229,580 B1 | 5/2001 | Inoue | |
| 7,016,075 B1 | 3/2006 | Tsukada | |
| 2005/0244054 A1* | 11/2005 | Hsieh | 382/167 |
| 2005/0251644 A1* | 11/2005 | Maher et al. | 712/2 |

FOREIGN PATENT DOCUMENTS

| | | | |
|---|---|---|---|
| EP | 1 087 614 A2 | 3/2001 | |
| JP | 10-198795 | 7/1998 | |
| JP | 2004297438 A | * 10/2004 | |
| KR | 2001-0076770 | 8/2001 | |

OTHER PUBLICATIONS

Japanese-Language Translation of Korean Office Action dated Oct. 8, 2008 with Partial English Language Translation.

* cited by examiner

*Primary Examiner* — Kee M Tung
*Assistant Examiner* — Jwalant Amin
(74) *Attorney, Agent, or Firm* — McGinn Intellectual Property Law Group, PLLC

(57) ABSTRACT

A color correction apparatus includes a correction unit to correct a color of an input pixel having a color included in a specified region of a color space, a correction range selector to select a range with a center in a grayscale to the specified region. With this color correction apparatus, a grayscale can be specified as the target color and only a part of a region in white component direction can be set as the correction range. Thus a desired range of the grayscale can be corrected.

21 Claims, 17 Drawing Sheets

US 8,004,537 B2

APPARATUS, METHOD, AND PROGRAM PRODUCT FOR COLOR CORRECTION

BACKGROUND OF THE INVENTION

1. Field of the Invention

The present invention relates to an apparatus, a method, and a program product for color correction, and particularly to an apparatus, a method, and a program product for color correction to correct a color of each input pixel of an input pixel.

2. Description of Related Art

Conventionally, a method for changing a color temperature of an image in order to emphasize the image visually and improve the quality of the image when being displayed has been used. For example to increase the color temperature of the image, the image is corrected to bluish color. To decrease the color temperature of the image, the image is corrected to reddish color. Further, to change the color temperature visually increase or decrease, only around the white may be corrected to be more bluish or reddish.

When correcting a color of an image, the color must be expressed by a combination of numeric values for a specification and correction of the color or the like. Generally as a way of expressing a color, there are known methods; the HSV format in which the colors are expressed in an HSV color space, and the RGB format in which the colors are expressed in a RGB color space.

FIG. 15 is a view showing an HSV color space. The HSV color space is represented by a six-sided pyramid, with its center axis is a Value V, an axis extending from the center axis radically is a Saturation S, and an angle toward an outer peripheral direction of the six-sided pyramid is an Hue H. When changing the Hue H with the Value V and the Saturation S at maximum, the color changes to red, yellow, green, cyan, blue, and magenta by every 60 degrees. The saturation S becomes the highest and most vivid color around the periphery and becomes diluted near the central axis. The value V is the darkest near the six-sided pyramid's top and the brightest near the base of the six-sided pyramid. The value V is the darkest near the six-sided pyramid's top and the brightest near the base of the six-sided pyramid. A range of the HSV value in that HSV can take is $0<=S, V<=1.0$, and $0<=H<360$.

FIG. 16 is a view showing a general RGB color space. The RGB color space is represented by a three-dimensional coordinate with red, blue, and green axes orthogonal to each other. With blue being 0, and green and red being 1, the color is yellow. With red being 0, and the green and blue being 1, the color is cyan. With green being 0, and red and blue being 1, the color is magenta. With red, blue, and green being all 0, the color is black. With red, blue, and green being all 1, the color is white. The axis connecting the black and white is gray scale. However a range the red, blue, and green can take shall be $0<=$red, and blue and green $<=1$.

For example in the color spaces of FIGS. 15 and 16, to achieve an effect to increase and decrease the color temperature visually, white is corrected to bluish or reddish color.

A conventional color correction apparatus for correcting a color in a specified range of an image to a desired color is known. For example a color correction apparatus disclosed in Japanese Unexamined Patent Application Publication No. 10-198795 specifies a target color to be corrected and a correction color after the color correction so as to correct pixels in a specified range including the target color. The conventional color correction apparatus calculates an approximation hx that indicates a degree of approximation of an input pixel to the target color and the correction amount by multiplying the approximation hx and a correction coefficient in order to correct the color by adding the correction amount to the input pixel.

In the conventional color correction apparatus, to specify a correction range in the HSV format, ranges shown in FIGS. 17 and 18 become the correction range. In an example of the conventional correction apparatus, as a range of the hue H is specified to calculate the approximation hx, a part of the Hue H, and entire portions of the Saturation S and the Value V becomes the correction range as shown in FIG. 17. Accordingly as long as the color is in a range of the part of the Hue H, the color can be corrected independent of the Saturation S and the Value V.

Further, in another example of a conventional color correction apparatus, all the ranges of the Hue H, Saturation S, and Value V are specified to calculate the approximation hx. Thus as in FIG. 18, a part of the Hue H, Saturation S, and Value V become the correction range. Accordingly only the colors included in the ranges of a part of the Hue H, Saturation S, and Value V are corrected.

Furthermore in the conventional color correction apparatus, to specify a correction range in the RGB format, the correction ranges shown in FIGS. 19 and 29 become the correction range. In the conventional color correction apparatus, as the white component is removed to calculate the approximation hx, the color can be corrected independent of the white component.

FIG. 19 is a view showing a case in which the target color is set to any color other than grayscale. In this case, within a specified range with its center at a line extended from the target color to the white component direction, the range having no restriction towards the white component becomes the correction range. FIG. 20 is a view showing a case in which the target color is set to any color other than grayscale. In this case, in a specified range with its center at the grayscale, a range that has no restriction towards the white component direction becomes the correction range.

As described in the foregoing, when changing the color temperature of an input image, only a part of grayscale color such as a portion close to white needs to be changed.

However in the conventional color correction apparatus, if the correction range including the target color is specified in the HSV format, the Hue H is restricted to a part of the range as with FIGS. 17 and 18, the correction range cannot be set with a color in the grayscale at the center and to the entire Hue H. Accordingly in the HSV format, a color in the grayscale cannot be specified as the target color, thus only a part of the grayscale cannot be specified as the correction range.

Furthermore in the conventional color correction apparatus, when specifying a correction range including the target color in the RGB format, the correction range is always set to a range having no restriction in the white component direction. Accordingly in the RGB format, the correction range cannot be restricted in the white component direction with a color in the grayscale as the target color. Thus in a case the target color is set to white to correct near white, the correction is made independent of the white component. Accordingly even a region not intended to be corrected such as a color close to black is corrected and the entire grayscale is colored.

Accordingly in a conventional color correction apparatus, it has now been discovered that sometimes only a part of the region in the white component direction cannot be set as the correction range, and thus it is not possible to specify the target color in the grayscale to do a correction restricting in the white component direction.

SUMMARY OF THE INVENTION

According to an aspect of the present invention, there is provided a color correction apparatus that includes a correction unit to correct a color of an input pixel having a color included in a specified region of a color space, and a correction range selector to select a range with a center in a grayscale to the specified region. With this color correction apparatus, a grayscale can be specified as the target color and only a part of a region in white component direction can be set as the correction range. Thus a desired range of the grayscale can be corrected.

According to another aspect of the present invention, there is provided a method for color correction to correct a color of an input pixel having a color included in a specified region of a color space. The color correction method includes selecting a region having a center in a grayscale as the specified region. With this color correction method, a grayscale can be specified as the target color and only a part of a region in white component direction can be set as the correction range. Thus a desired range of the grayscale can be corrected.

According to another aspect of the present invention, there is provided a program product to execute a color correction process by a computer to correct a color of an input pixel having a color included in a specified region of a color space. The program product includes selecting a region having a center in a grayscale as the specified region. With this color correction program product, a grayscale can be specified as the target color and only a part of a region in white component direction can be set as the correction range. Thus a desired range of the grayscale can be corrected.

According to another aspect of the present invention, there is provided a color correction apparatus to correct a color of an input pixel having a color included in a specified region of a RGB color space. The color correction apparatus includes a correction range selector to select a range having a boundary in a black or a white direction with a center at any color in the RGB color space as the specified region. With this color correction apparatus, any color can be specified and only a part of a region in white component direction can be set as the correction range. Thus only a desired range of the grayscale can be corrected.

The present invention provides an apparatus, a method, and a program product for setting a part of range of the white color component direction as the correction range and correcting only a desired color.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

A color correction apparatus according to a first embodiment of the present invention is described hereinafter in detail. The color correction apparatus of this embodiment sets a part of range in the white color direction as the correction range when calculating the approximation in the RGB format.

Figure 1:
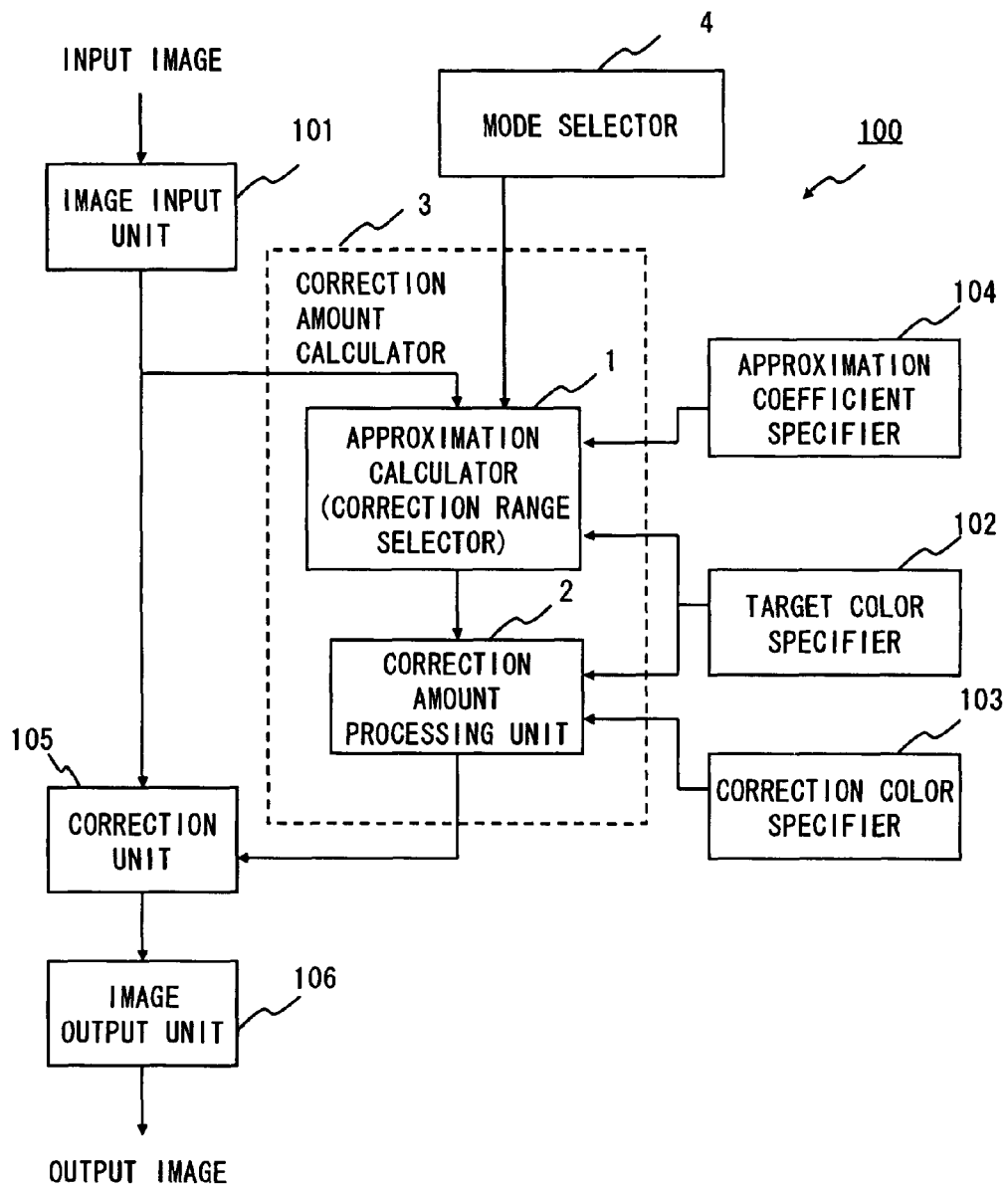
FIG. 1 is a block diagram showing a configuration of a color correction apparatus according to the present invention.

The configuration of the color correction apparatus according to this embodiment is described hereinafter in detail with reference to the block diagram of FIG. 1. As shown in FIG. 1, a color correction apparatus 100 includes an image input unit 101, a target color specifier 102, a correction color specifier 103, an approximation coefficient specifier 104, a mode selector 4, a correction amount calculator 3, a correction unit 105, and an image output unit 106. The correction amount calculator 3 further includes an approximation calculator 1 and a correction amount processing unit 2.

The image input unit 101 is for example an input buffer input with an input image constituted of a plurality of pixels. After inputting each pixel of the input image, the image input unit 101 provides the pixels in an order of input to the approximation calculator 1 of the correction amount calculator 3 and the correction unit 105. Each pixel of the input image is color data in the RGB format, for example.

The target color specifier 102 is specified (input) externally with a target color to be corrected and provides the target color to the approximation calculator 1 and the correction amount processing unit 2 of the correction amount calculator 3. The target color is specified in the RGB format, for example. The target color specifier 102 is able to specify any color including a grayscale color in a RGB color space as a target color.

The correction color specifier 103 is specified (input) externally with a correction color to be corrected and provides the correction color to correction amount processing unit 2 of the correction amount calculator 3. The correction color is specified in the RGB format, for example.

The approximation coefficient specifier 104 is specified (input) externally with an approximation coefficient to determine a decrease trend of the approximation (approximation characteristic) and provides the approximation coefficient to the approximation calculator 1 of the correction amount calculator 3. As the approximation coefficient, a weight for specifying the decrease trend (slope) of the approximation, an approximation limit, and a correction range can be considered. In this embodiment, the weight is specified as the approximation coefficient.

The mode selector 4 provides a selection signal "select" to the approximation calculator 1 for selecting a correction mode. The selection mode is a mode for enabling to select whether to limit the correction range towards the white color component. The selection of the correction mode may be specified externally or selected by referring the target color etc. For example if the correction range includes a grayscale such as the white color, a mode for enabling to select the correction range by the color and the white can be used.

The correction amount calculator 3 calculates an approximation hx that indicates a degree of approximation to the target color for the input pixel, and calculates the correction amount to correct the input pixel according to the approximation hx. The correction amount calculator 3 changes the amount of color correction in an order of the color aligned from inside a specified region toward the boundary. Specifically, the correction amount calculator 3 reduces the correction amount so that it is reduced to 0 at the boundary of the correction range according to the color distance from the target color, which is the center of the correction region. The color distance is a distance between colors in the color spaces including RGB and HSV.

The approximation calculator 1 calculates the approximation of each pixel constituting the input image according to the target color and the decrease trend of the approximation that is determined by the approximation coefficient, and then provides the approximation to the correction amount processing unit 2. In this embodiment, the approximation calculator 1 selects a correction according to the correction mode of the selection signal "select" from the mode selector 4 so as to calculate the approximation. The approximation calculator 1 is also a correction range selector that is able to select a region including a boundary to black or white direction with its center at any color or a grayscale color as the correction range.

Specifically, in the correction mode in which the correction range is selected only by the color component, the approximation calculator 1 calculates the approximation hx using only the color component that is removed with the white color component from the target color and the input pixel. In the mode in which the correction range is selected by color and white, the approximation hx is calculated including the target color and the input pixel. The white color component is the white color component included in the target color, and is a component proceeding to the white direction that is parallel to the grayscale in the color space. The color component is the pure color component, which is the target color removed with the white component.

The approximation hx indicates the degree of approximation of the input pixel to the target color that is to be corrected. The approximation hx is a numeric value from 0 to 1.0 indicating how much the input pixel should be moved in the color space. The color is corrected to be close to the correction color according to the approximation hx. With the approximation hx=1.0, the input pixel are fully corrected to the correction color. With the approximation hx=0.5, the input pixel is corrected to a medium color between the target and correction colors. With the approximation hx=0, the input pixel is not corrected.

The correction amount processing unit 2 calculates the correction amount according to the target and correction colors and the approximation, and then provides the calculated correction amount to the correction unit 105. The correction amount processing unit 2 calculates the correction amount as in "Correction amount=approximation hx*(correction color−target color)". The correction amount may be calculated by specifying the correction coefficient instead of the correction color as in "Correction amount=approximation hx*correction coefficient".

The correction unit 105 corrects each pixel of the input image and provides the corrected output pixels to the image output unit 106. The correction unit 105 calculates the output pixels as in "Output pixel=input pixel+correction amount". The image output unit 106 is an output buffer, for example, that is sequentially input with output pixels being corrected, and outputs the output pixels to outside as an output image.

Figure 2:
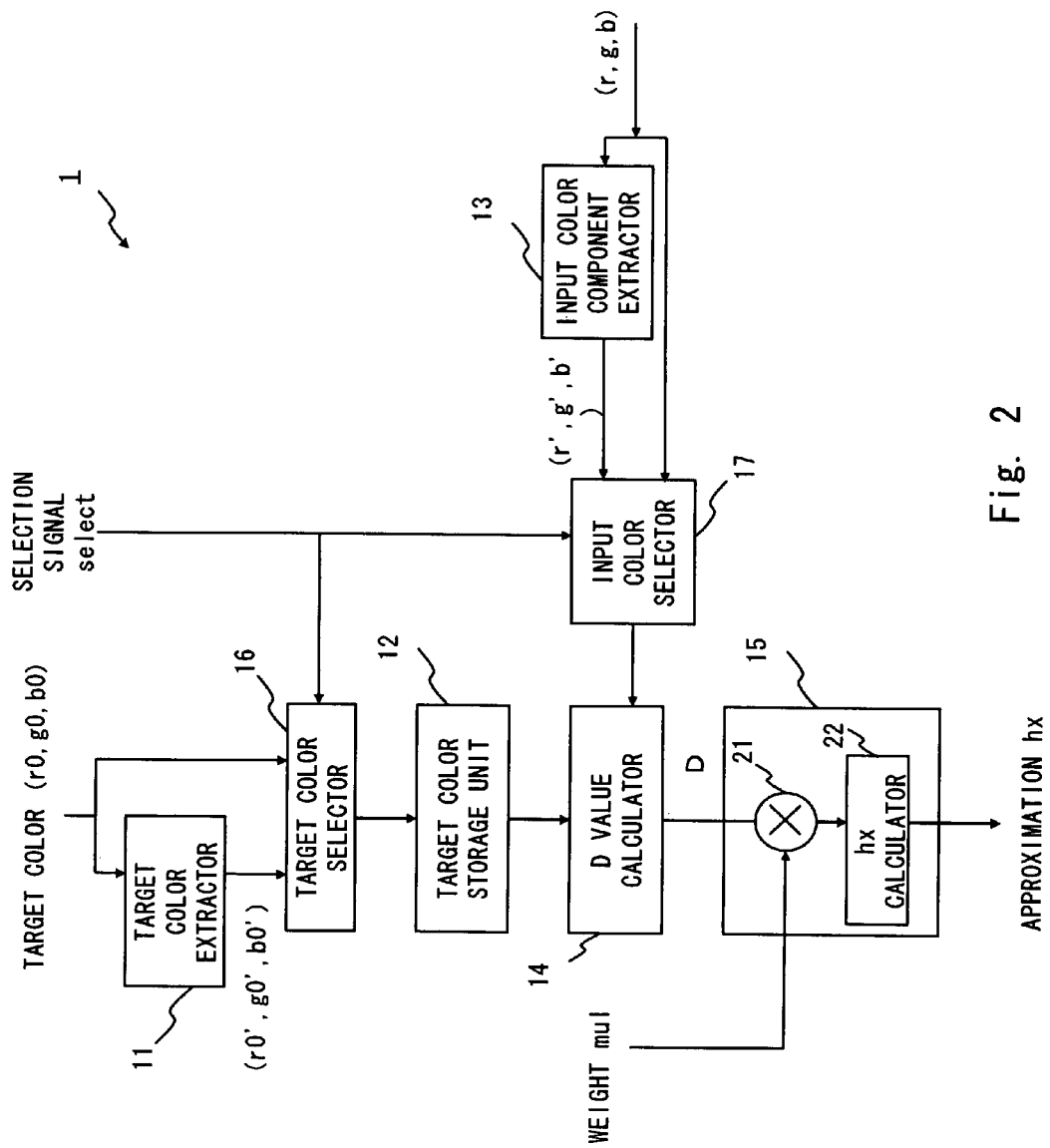
FIG. 2 is a block diagram showing a configuration of an approximation calculator according to the present invention.

The configuration of the approximation calculator of a color correction apparatus according to the present embodiment is described hereinafter in detail with reference to the block diagram of FIG. 2. The approximation calculator of this embodiment calculates the approximation hx in the RGB format. As shown in FIG. 2, the approximation calculator 1 includes a target color component extractor 11, a target color component storage unit 12, an input color component extractor 13, a D value calculator 14, and an hx output unit 15, a target color selector 16, and an input color selector 17. Further, the hx output unit 15 includes a multiplier 21, and an hx calculator 22.

The target color component extractor 11 extracts color components (r0', g0', b0') of the target color (r0, g0, b0) specified by the target color specifier 102. The target color selector 16 selects either the specified target color (r0, g0, b0) or the color components of the target color (r0', g0', b0') that is extracted by the target color component extractor 11 according to the selection signal "select" that is input from the mode selector 4, and provides it to the target color storage unit 12.

The target color component storage unit 12 stores the target color (r0, g0, b0) or the color components (r0', g0', b0') of the target color that is selected by the target color component selector 16.

The input color component extractor 13 extracts color components (r', g', b') of the input pixel (r, g, b) that is input from the image input unit 101. The input color selector 17 selects either the input pixels being input (r, g, b) or the color components of the input pixel (r', g', b') that is extracted by the input color component extractor 13 according to the selection signal "select" that is input from the mode selector 4, and provides it to the D value calculator 14.

The D value calculator 14 calculates the D value that represents a color distance between the color components of the target color (r0', g0', b0') or the color components of the target color (r0', g0', b0') that is stored to the target color storage unit 12 and the input pixel (r, g, b) or the color components of the input pixel (r', g', b') that is selected by the input color selector 17.

The hx output unit 15 calculates and outputs the approximation hx according to the D value that is calculated by the D value calculator 14, and a weight mul that is specified by the approximation coefficient specifier 104. The multiplier 21 multiplies the D value by the weight mul, and the hx calculator 22 calculates the approximation hx by a linear function using the result of the multiplication by the multiplier 21.

Figure 3:
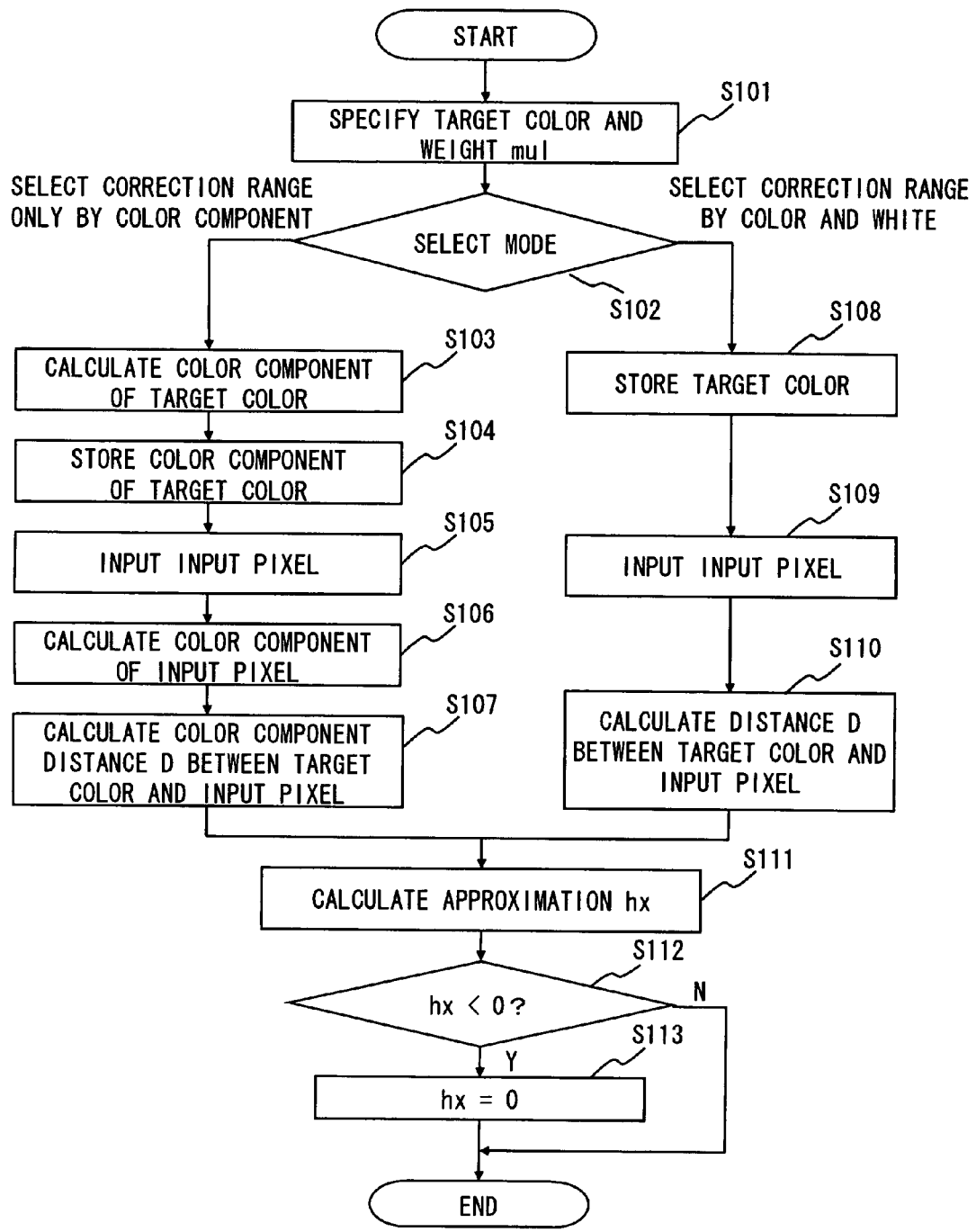
FIG. 3 is a flowchart showing an approximation calculation method according to the present invention.

An approximation calculation method by the approximation calculator 1 of the color correction apparatus according to the present embodiment is described hereinafter in detail with reference to the flowchart of FIG. 3. Firstly the target color (r0, g0, b0), and the weight mul are specified to the approximation calculator 1 (S101).

Then the selection signal "select" is input to the target color selector 16 and the input color selector 17 to select the correction mode (S102). In the correction mode in which the correction range is selected only by the color component, the target color selector 16 selects the output from the target color component extractor 11. If the correction mode is the mode in which the correction range is elected by color and white, the target color selector 16 selects the target color (r0, g0, b0). If the correction mode is the mode in which the correction range is selected only by the color components, the input color selector 17 selects the output from the input color component extractor 13. In the correction mode in which the correction range is selected by the color and white, the input color selector 17 selects the input pixel (r, g, b).

If the correction mode is the mode in which the correction range is selected only by the color component in S102, the target color component extractor 11 calculates the color components (r0', g0', b0') which are the specified color removed with the white component (S103). The target color component extractor 11 subtracts the minimum value of the RGB value for the target color from the input pixels as in "(r0', g0', b0')=(r0, g0, b0)−min (r0, g0, b0)" so as to remove the white component and extract only the color component. Note that "min (r0, g0, b0)" is a function for selecting the minimum value in r0, g0, and b0.

Then the color component of the target color (r0', g0', b0') is selected by the target color selector 16 and stored to the target color storage unit 12 (S104).

Then the input pixels are sequentially input from the image input unit 101 (S105). The input color component extractor 13 calculates the color components (r', g', b') of the input pixel (r, g, b) (S106). The input color component extractor 13 subtracts the minimum value of the RGB value for the target color from the input pixels as in "(r', g', b')=(r, g, b)−min(r, g, b)" so as to remove the white component and extract only the color component.

Then the color component of the input pixel (r', g', b') is selected by the input color selector 17. The D value calculator 14 calculates the color distance D from the color components of the target color (r0', g0', b0') that are stored to the target color storage unit 12 and the color components of the selected input pixel (r', g', b') (S107).

The D value calculator 14 calculates a difference of the color components (dR, dG, dB) by subtracting the color components of the input pixel (r', g', b') from the color components of the target color (r0', g0', b0', as in "(dR, dG, dB)=(r0'−r', g0'−g', b0'−b')". Then the D value calculator 14 calculates the D value by subtracting the minimum value in (dR, dG, dB) from the maximum value in (dR, dG, dB) as in "D=max(dR, dG, dB)−min(dR, dG, dB)".

On the other hand in the correction mode in which the correction range is elected by the color and white, the target color (r0, g0, b0) is selected by the target color selector 16 and stored to the target color storage unit 12 (S108). Then the input pixels are sequentially input from the image input unit 101 (S109), and the input pixel (r, g, b) are selected by the input color selector 17.

Then the D value calculator 14 calculates the color distance D from the color components (r0, g0, b0) of the target color that is stored in the target color component storage unit 12 and the selected input pixel (r, g, b) (S110).

The D value calculator 14 calculates a difference of the color components including white component (dR, dG, dB) by subtracting the input pixel (r, g, b) from the target color (r0, g0, b0), as in "(dR, dG, dB)=(r0−r, g0−g, b0−b)". Then the D value calculator 14 calculates the D value by subtracting the minimum value in (dR, dG, dB) from the maximum value in (dR, dG, dB) as in "D=max(dR, dG, dB)−min(dR, dG, dB)".

After calculating the D value in S107 or S110, the multiplier 21 of the hx output unit 15 and the hx calculator 22 calculates the approximation hx by a linear function including the D value and the weight mul (S111). Specifically, the approximation hx is calculated by the following formula 1.

$$hx = 1.0 - mul * D \tag{Formula 1}$$

Then the hx calculator 22 evaluates whether the calculated approximation hx is smaller than 0 (S112). If the approximation hx is smaller than 0, the approximation hx=0 (S113).

Figure 19:
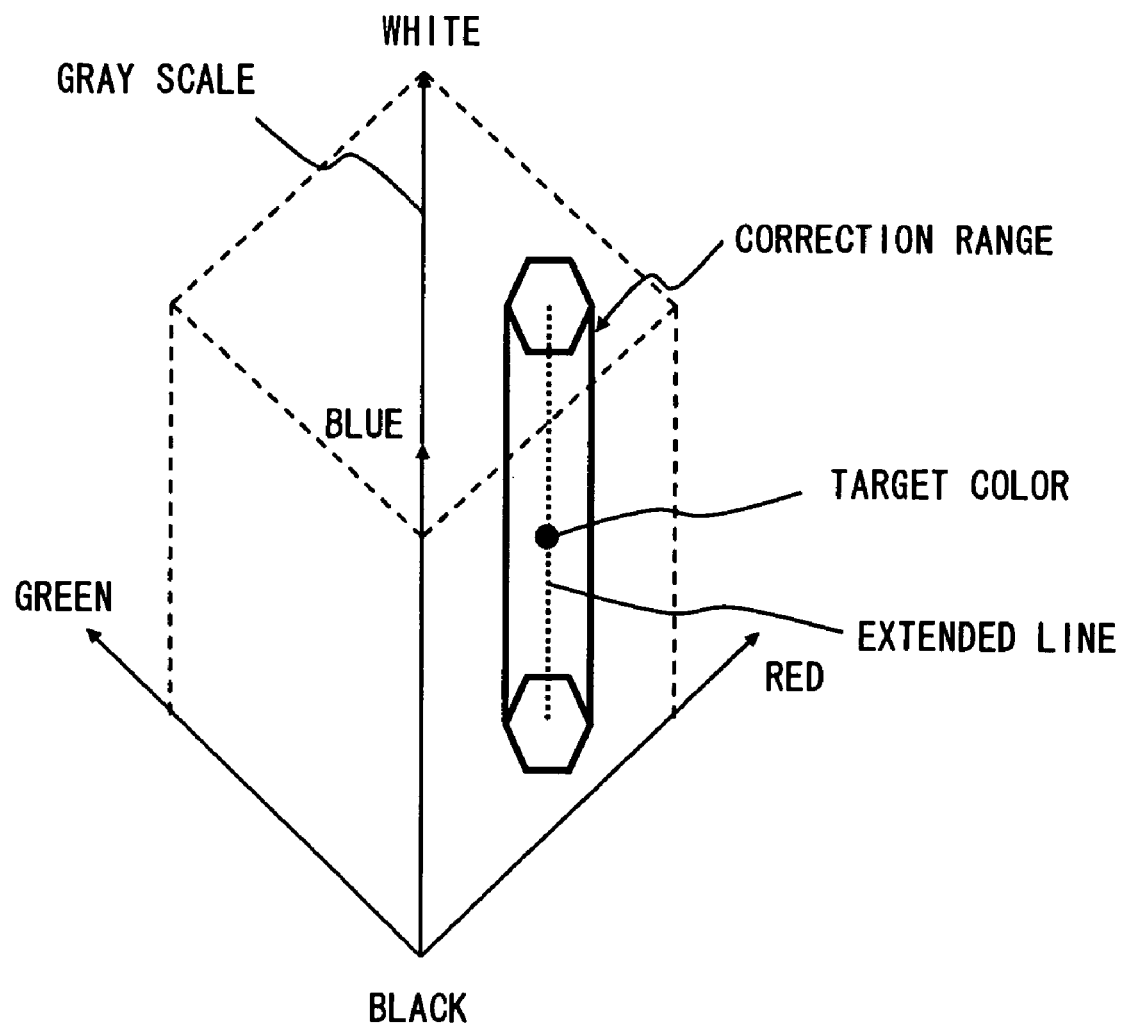
FIG. 19 is an image diagram showing an RGB color space used in the conventional approximation calculation method.
Figure 20:
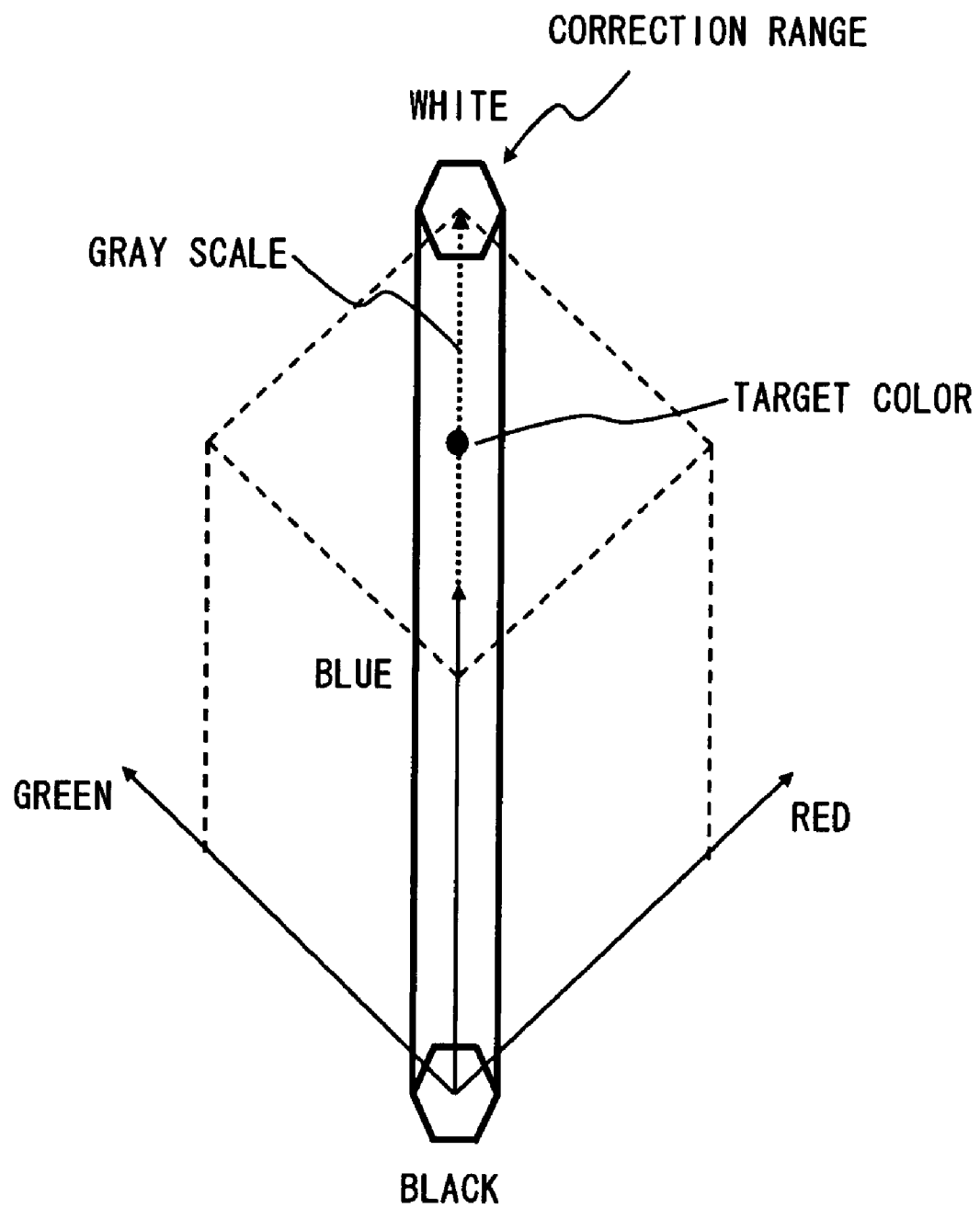
FIG. 20 is an image diagram showing the RGB color space used in the conventional approximation calculation method.

Next, the correction range in the RGB color space of this embodiment is described hereinafter in detail. If the correction range is the mode in which the correction range is elected only by the color component, the white component is removed to calculate the approximation hx. Thus as with the conventional example of FIGS. 19 and 20, there is no restriction towards the white component direction, and pixels of the same color component becomes the correction range with its center at the target color.

Further, if the correction mode is the mode in which the correction range is selected by color and white, the approximation hx is calculated including the white color component, thus the range restricted in the white component direction.

Figure 4:
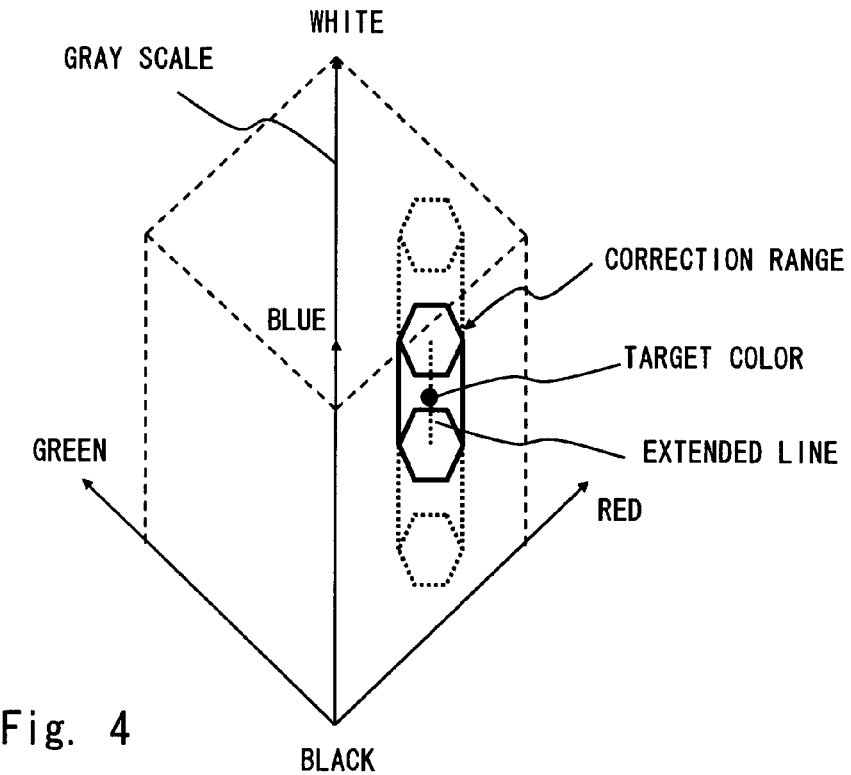
FIG. 4 is an image diagram showing a RGB color space used in an approximation calculation method according to the present invention.
Figure 5:
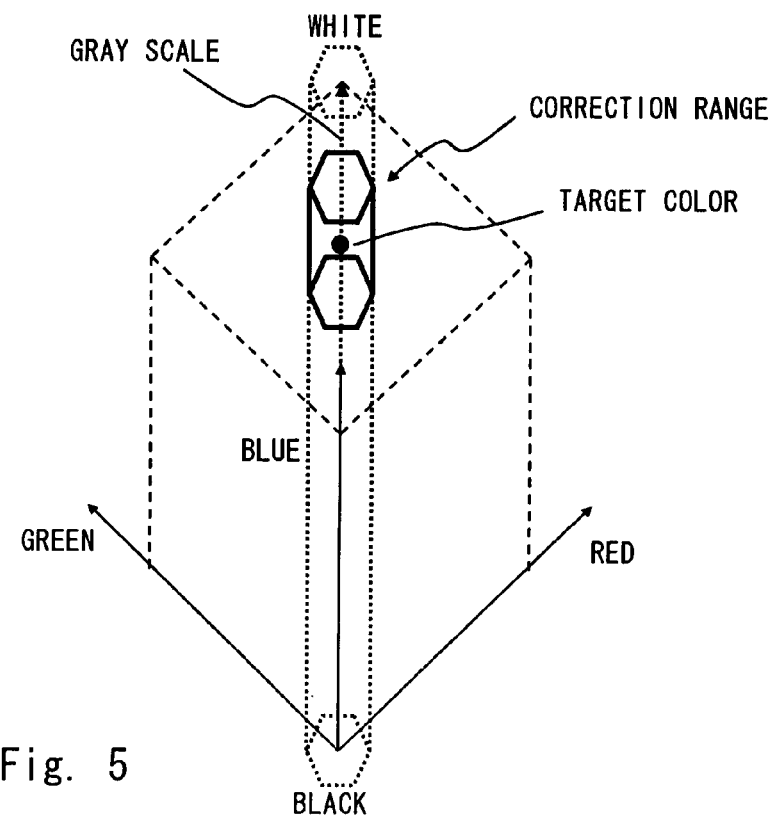
FIG. 5 is an image diagram showing the RGB color space used in an approximation calculation method according to the present invention.

FIG. 4 is a view showing a case in which the target color is set to any color other than the grayscale. In this case, within the specified range with its center at a line extended from the target color to the white component direction, the range restricted in the white color direction becomes the correction range. FIG. 5 is a view showing a case in which the target color is set to a color in the grayscale. In this case, a part of the range that is restricted in the white component direction becomes the correction range. Accordingly it is possible to correct only the color with its white component close to the target color can be corrected even when any color other than the grayscale is set as the target color or the color in the grayscale including white and black is set as the target color.

Figure 6:
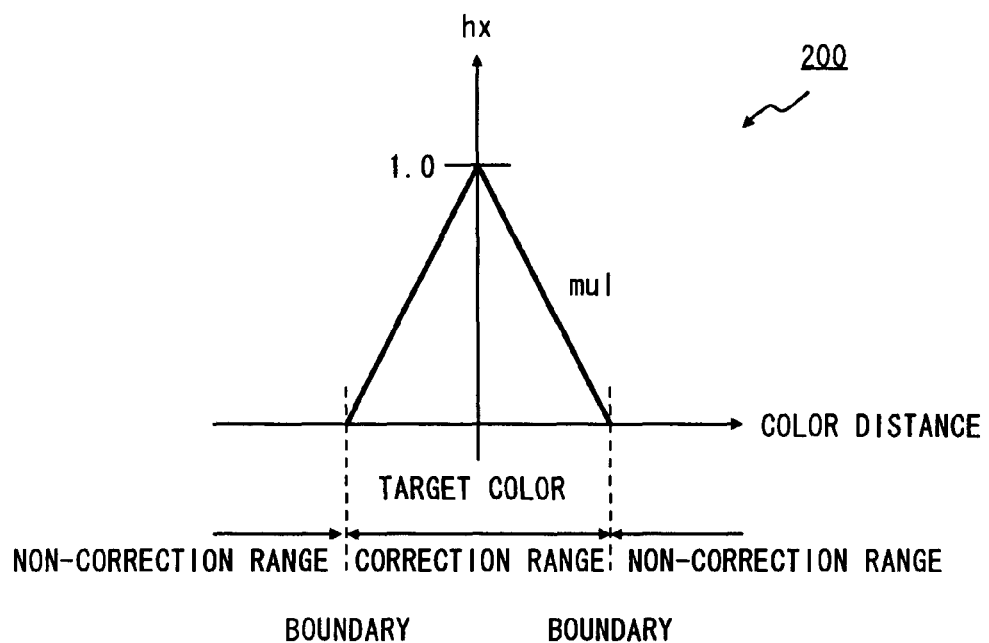
FIG. 6 is an image diagram showing an approximation characteristic obtained by an approximation calculation method according to the present invention.

FIG. 6 is an image of the approximation hx (approximation characteristic) to the color distance from the target color calculated by the approximation calculator 1. As the correction amount is calculated by multiplying the approximation hx and the correction coefficient, the color is corrected by the correction amount corresponding to the approximation characteristic.

In this embodiment, since the approximation is calculated by a linear function as with the formula 1 that is based on the target color and the weight, which is the approximation coefficient, the approximation decreases only at a constant decrease trend as with an approximation characteristic 200.

Specifically, the approximation characteristic 200 is a characteristic extending with its center at the approximation hx=1.0 of the target color, the approximation decreasing to 0 as the color distance to the target color increases. A range surrounded by boundary contacting the color distance (horizontal) axis of hx=0 is the correction range. A range distant to the correction range is non-correction range. In the approximation characteristic 200, the approximation hx decreases at a slope defined by "−mul*D" as it gets away from the target color.

As described in the foregoing, in this embodiment, to calculate the approximation in the RGB format, by calculating the approximation including the white component of the target color and the input pixel, the range restricting in the white component direction can be specified as the correction range. Therefore, it is possible to prevent the entire color in the white color direction from being unnecessary corrected and only the necessary color can be corrected. Accordingly only the colors close the color in the grayscale including white and black can appropriately corrected when changing a color temperature or the like.

Second Embodiment

A color correction apparatus according to a second embodiment of the present invention is described hereinafter in detail. The color correction apparatus of this embodiment is characterized in that when calculating the approximation in the RGB format, the amount of correction around the boundary of the correction range can be reduced.

When calculating the approximation hx as in the first embodiment, the approximation decreases only at a constant trend as it gets away from the target color as in FIG. 6. Thus the color sometimes largely changes near the boundary of the correction range, making the color change visually noticeable and thereby generating a contouring. Specifically, the contouring could easily be generated especially when correcting a color in the grayscale such as white and black including when changing the color temperature.

Figure 7:
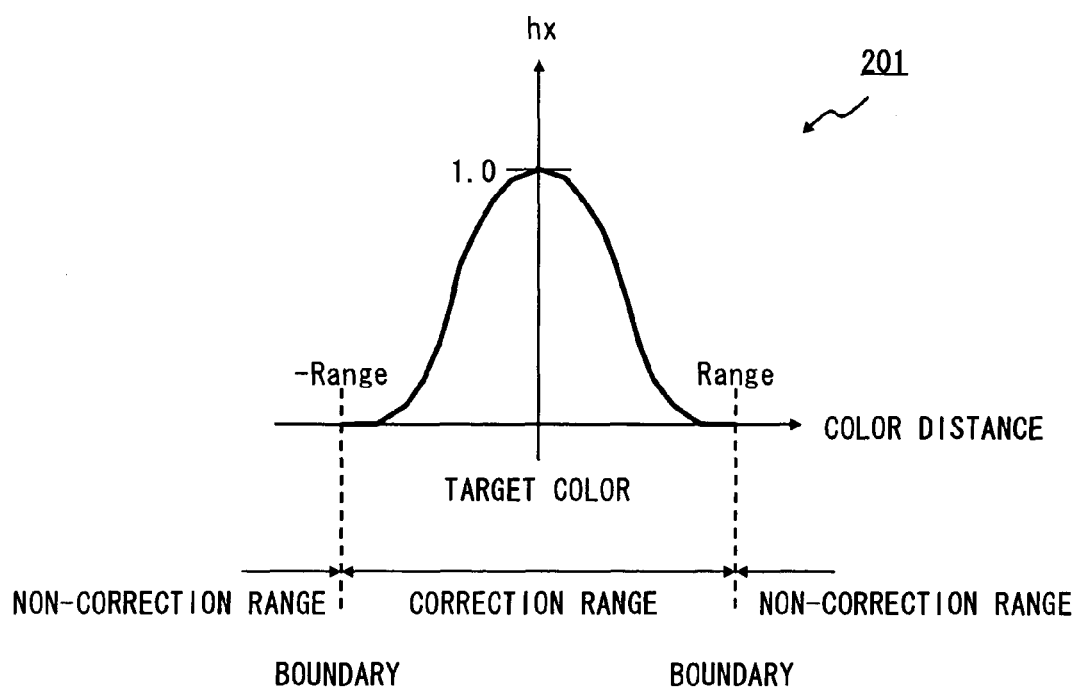
FIG. 7 is an image diagram showing the approximation characteristic obtained by an approximation calculation method according to the present invention.

Therefore in this embodiment, the contouring is suppressed by suppressing the change of the color near the boundary of the correction range as with the approximation characteristic 201 of FIG. 7. Specifically, the decrease trend of the approximation is suppressed to reduce the decrease trend near the boundary of the correction range depending on the color distance from the target color. Note that not limited to the approximation characteristic 201, the approximation may be calculated by a function having a plurality of inflection points and extreme values, a plurality of linear functions or more than one multidimensional functions, or a combination of any of different functions as long as the correction amount near the boundary of the correction range is reduced.

In this embodiment, as an example of using two linear functions, the approximation is calculated by a broken line function. The broken line function is a function having a curve that the numeric value indicated by the function turning at least once.

An entire configuration of the color correction apparatus of this embodiment is identical to the one shown in FIG. 1 of the first embodiment. In this embodiment, the approximation coefficient specified by the approximation coefficient specifier 104 are weight mul, and mul2, and the approximation limit "limit". Further, the correction amount calculator 3 non-linearly changes the amount of the color correction in an order of the color aligned from inside a specified region toward the boundary.

Figure 8:
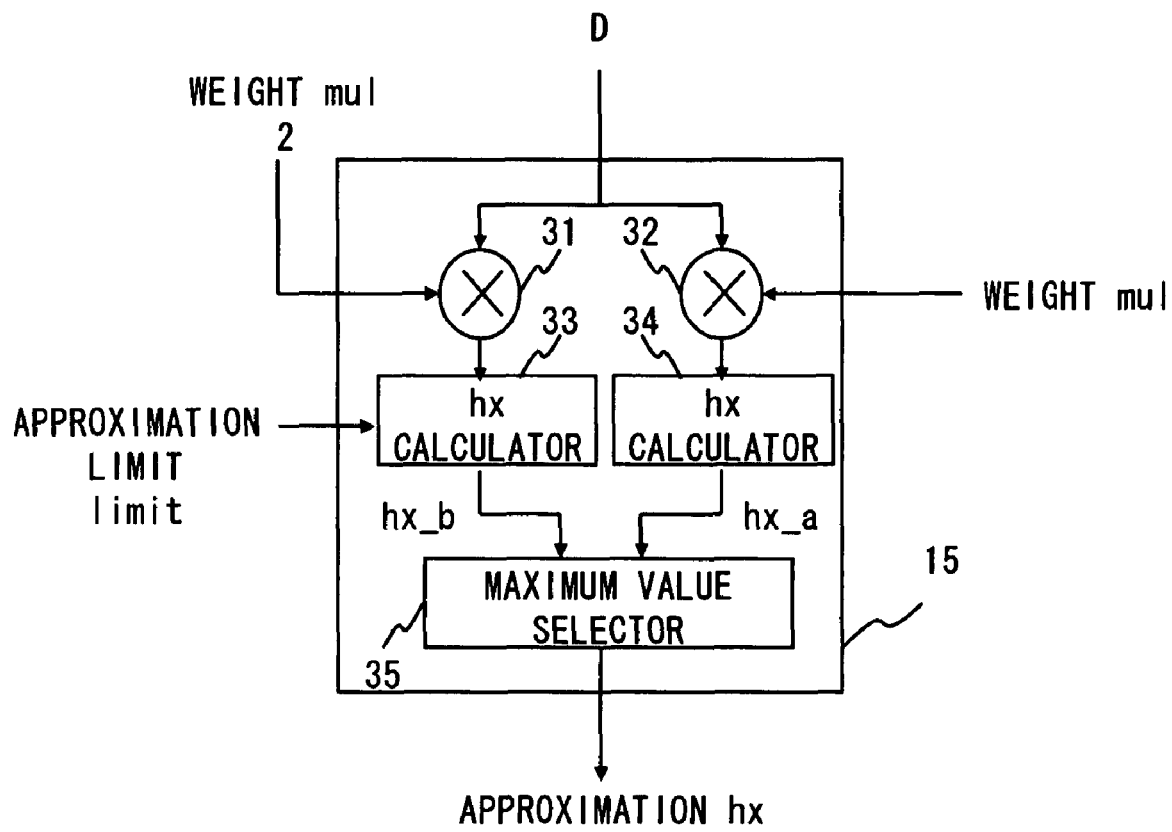
FIG. 8 is a block diagram showing a configuration of the approximation calculator according to the present invention.

The block diagram of FIG. 8 shows a configuration of the hx calculator included in the approximation calculator of the color correction apparatus of this embodiment. The configuration other than the hx output unit 15 is identical to those in FIG. 2. The hx output unit 15 includes multipliers 31 and 32, hx calculators 33 and 34, and a maximum value selector 35.

The hx output unit 15 calculates and outputs the approximation hx according to the D value that is calculated by the D value calculator 14, the weights mul and mul2 that are specified by the approximation coefficient specifier 104, and the approximation limit "limit".

The multiplier 32 multiplies the D value and the weight mul, and the hx calculator 34 calculates the approximation hx using a linear function using the result of the multiplication by the multiplier 32. The multiplier 32 and the hx calculator 34 calculate a first approximation from a first linear function. Specifically, they constitute a first decrease trend calculator for controlling the approximation to be in a first decrease trend.

The multiplier 31 multiplies the D value by the weight mul2. The hx calculator 33 calculates the approximation hx by the linear function using the multiplication result of the multiplier 31 and the approximation limit "limit". The multiplier 31 and the hx calculator 33 calculate a second approximation obtained from a second linear function. Specifically the multiplier 31 and the hx calculator 33 form a second decrease trend calculator for controlling the approximation to be in a second decrease trend. The second decrease trend is a trend that suppresses the first decrease trend, specifically a slope of the second decrease trend is more gradual than that of the first decrease trend.

The maximum value selector 35 selects the maximum value between the calculation results by the hx calculators 33 and 34, and then outputs the selected value as the approximation hx. Specifically the maximum value selector 35 selects either a first approximation obtained by the multiplier 32 and the hx calculator 34 or a second approximation obtained by the multiplier 31 and the hx calculator 33.

Next, an approximation calculation method by the approximation calculator 1 of the color correction apparatus according to this embodiment is described hereinafter in detail. The processes other than the approximation calculation process (S111 to S113 in FIG. 3) by the hx output unit 15 are same as those in FIG. 3.

Figure 9:
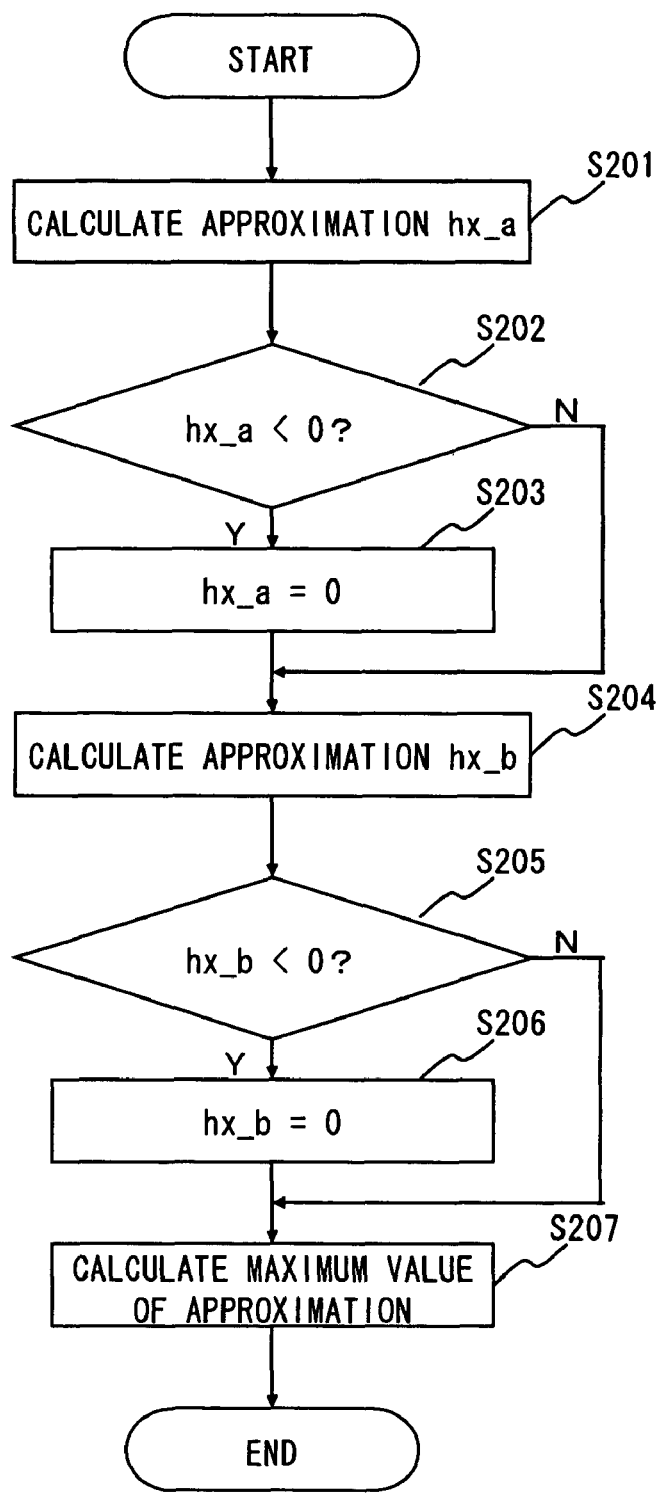
FIG. 9 is a flowchart showing an approximation calculation method according to the present invention.

A approximation calculation method by the approximation calculator of the color correction apparatus of this embodiment is described hereinafter in detail with reference to the flowchart of FIG. 9. After the target color (r0, g0, b0), the weights mul and mul2, and the approximation limit "limit" are specified to the approximation calculator 1 and the D value is calculated as in S101 to S110 of FIG. 3, the hx output unit 15 calculates the approximation hx in the following way.

Firstly the multiplier 32 and the hx calculator 34 calculate an approximation hx_a by a linear function including the D value and weight mul (S201). Specifically, the approximation hx_a is calculated by the following formula 2.

$$hx\_a = 1.0 - mul*D \quad \text{(Formula 2)}$$

Then the hx calculator 34 evaluates whether the approximation hx_a is smaller than 0 (S202). If the approximation hx_a is smaller than 0, the approximation hx_a=0 (S203).

Then the multiplier 31 and the hx calculator 33 calculate an approximation hx_b by a linear function including the D value and weight mul (S204). Specifically, the approximation hx_b is calculated by the following formula 3.

$$hx\_b = limit - mul2*D \quad \text{(Formula 3)}$$

Then the hx calculator 33 evaluates whether the approximation hx_b is smaller than 0 (S205). If the approximation hx_b is smaller than 0, the approximation hx_b=0 (S206).

Then the maximum value selector 35 selects the maximum value from the approximations hx_a and hx_b and the maximum value is set as the approximation hx (S207). Accordingly in this embodiment, a larger value in the values of the formulas 2 and 3 is the approximation hx.

Figure 10:
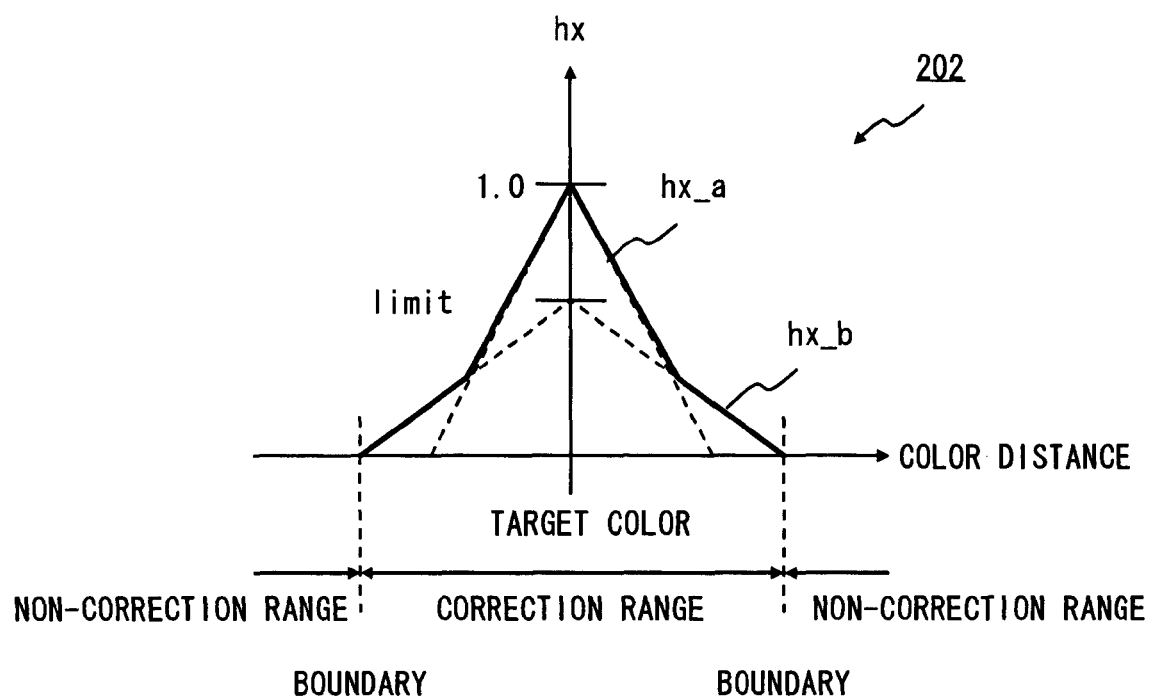
FIG. 10 is an image diagram showing the approximation characteristic obtained by the approximation calculation method according to the present invention.

FIG. 10 is a view showing an image of the approximation hx (approximation characteristic) for the color distance from the target color that is calculated by the approximation calculator 1. The approximation characteristic 202 is the characteristic that is calculated by the maximum value of the formulas 2 and 3.

As with the approximation characteristic 202, by setting that the value of the formula 2 to be larger in the range close to the target color, hx_a becomes the approximation hx, and the decrease trend of the approximation hx is determined by "−mul*D". Furthermore, by setting that the value of the formula 2 to be larger in the range close to the boundary of the correction color, hx_b becomes the approximation hx, and the decrease trend of the approximation hx is determined by "−mul2*D".

Accordingly the approximation characteristic 202 specifies the weight mul2 and the approximation limit "limit" so that the formula 3 is selected near the boundary of the correction range. In addition to that, by specifying the value of the weight mul2 to be smaller so as to have small correction amount, a sudden color change near the boundary of the correction range can be suppressed.

As described in the foregoing, in this embodiment, a function is selected, where the correction amount becomes small near the boundary of the correction range. Accordingly it is possible to prevent form changing the color near the boundary of the correction range to prevent from generating contouring.

Third Embodiment

A color correction apparatus according to a third embodiment of the present invention is described hereinafter in detail. The color correction apparatus of this embodiment sets a color in the grayscale as the target color when calculating the approximation in the HSV format and a part of range in the white component direction as the correction range.

An entire configuration of the color correction apparatus of this embodiment is identical to those in the first embodiment shown in FIG. 1. A target color is specified to the target color specifier 102 in the HSV format. Weights for each of the Hue H, Saturation S, and Value V in the HSV format are specified as approximation coefficient.

The correction mode selected by the mode selector 4 is the mode that enables one of the weights of the Hue H, Saturation S, and Value V to restrict the correction range. In this embodiment, the modes are referred to as an H restriction mode for restricting the range of the Hue H, a HSV restriction mode for restricting the ranges of the Hue H, Saturation S, and Value V, and a SV restriction mode for restricting the ranges of the Saturation S and Value V.

Figure 11:
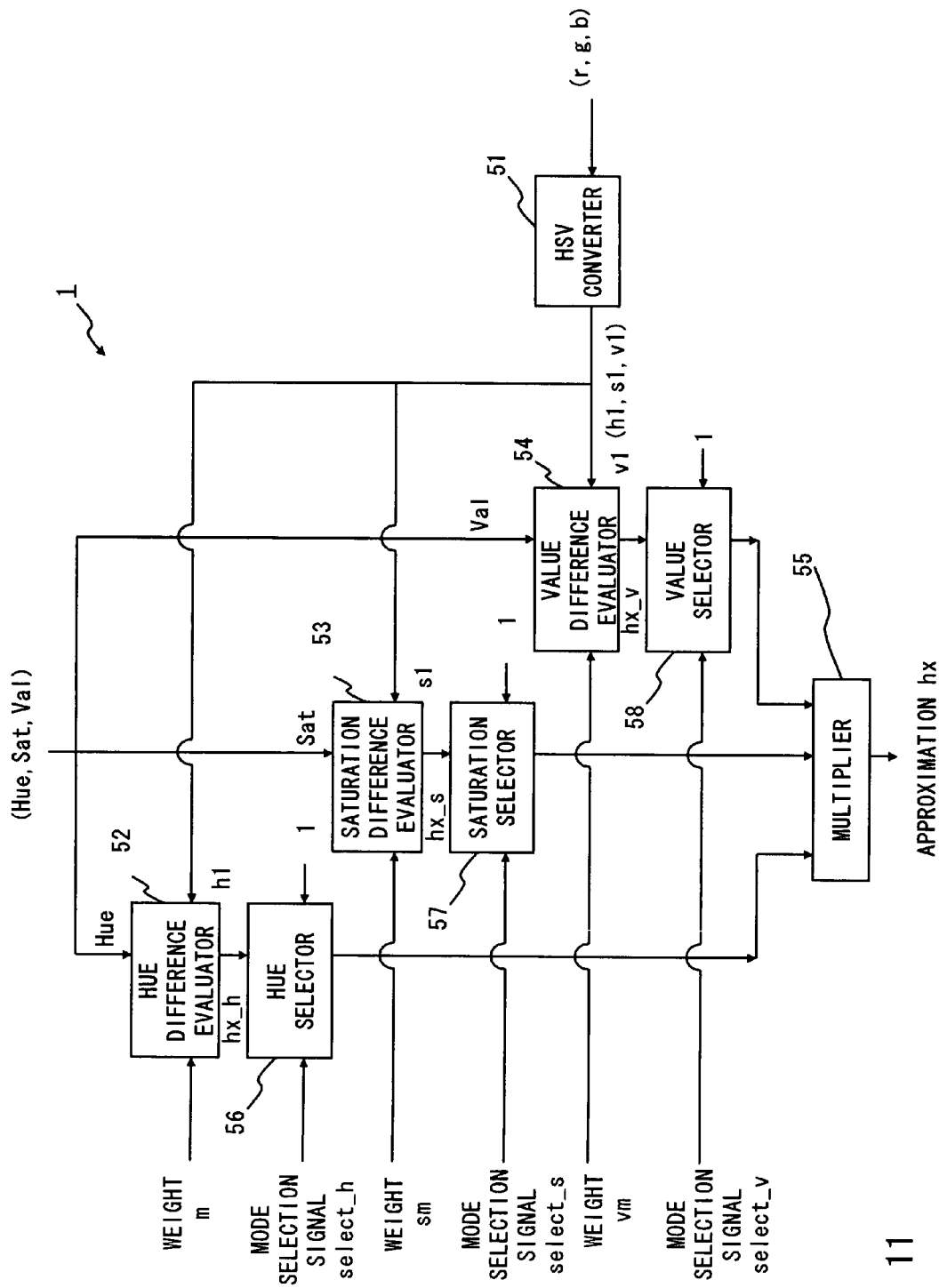
FIG. 11 is a block diagram showing a configuration of the approximation calculator according to the present invention.

The block diagram of FIG. 11 is a view showing a configuration of the approximation calculator of the color correction apparatus according to this embodiment. The color correction apparatus calculates the approximation by the HSV format. As shown in FIG. 11, the approximation calculator 1 includes an HSV converter 51, a hue difference evaluator 52, a value difference evaluator 53, a value difference evaluator 54, a multiplier 55, a hue selector 56, a saturation selector 57, and a value selector 58.

The HSV converter 51 converts the input pixel (r, g, b) of the RGB format input from the image input unit 101 into input pixel (h1, s1, v1) of the HSV format. The hue component h1 of the input pixel is given to the hue difference evaluator 52, the saturation component s1 of the input pixel is given to the saturation difference evaluator 53, and the value component v1 of the input pixel is given to the value difference evaluator 54.

The hue difference evaluator 52 is a hue approximation calculator that calculates an approximation of hx_h of hue component h1 of the input pixel according a hue component Hue of the target color that is specified by the target color specifier 102 and a weight m of the hue component that is specified by the approximation coefficient specifier 104.

The hue selector 56 selects either valid or invalid for the hue component that is calculated by the hue difference evaluator 52 according to the selection signal "select_h" of the hue component that is input from the mode selector 4. If the hue component is valid, the hue selector 56 selects and outputs the calculated approximation hx_h of the hue component. If the hue component is invalid, the hue selector 56 selects 1 and output it.

The saturation difference evaluator 53 is a saturation approximation calculator that calculates an approximation of hx_s of saturation component s1 of the input pixel according a saturation component Sat of the target color that is specified by the target color specifier 102 and a weight sm of the saturation component that is specified by the approximation coefficient specifier 104.

The saturation selector 57 selects either a valid or an invalid of the approximation of the saturation component that is calculated by the saturation difference evaluator 53 according to the selection signal "select_s" of the saturation component that is input from the mode selector 4. If the saturation component is valid, the saturation selector 57 selects and outputs the calculated approximation hx_s of the saturation component. If the saturation component is invalid, the saturation selector 57 selects 1 and outputs it.

The value difference evaluator 54 calculates the approximation hx_v of the value component v1 of the input pixel according to the value component Val that is specified by the target color specifier 102 and the weight vm of the value component that is specified by the approximation coefficient specifier 104.

The value selector 58 selects either a valid or a invalid of the approximation of the value component that is calculated by the value difference evaluator 54 according to the selection signal "select_v" of the value component that is input from the mode selector 4. If the value component is valid, the value selector 58 selects and outputs the calculated approximation hx_v of the value component. If the value component is invalid, the value selector 58 selects 1 and outputs it.

The multiplier 55 multiplies the approximation hx_h of the hue component, the approximation hx_s of the saturation components, and the approximation hx_v of the value component, and then outputs the multiplication result as the approximation hx. Specifically, the multiplier 55 multiplies a value that is selected as invalid by the selection signal "select" among the approximations hx_h, hx_s, and hx_v.

Figure 12:
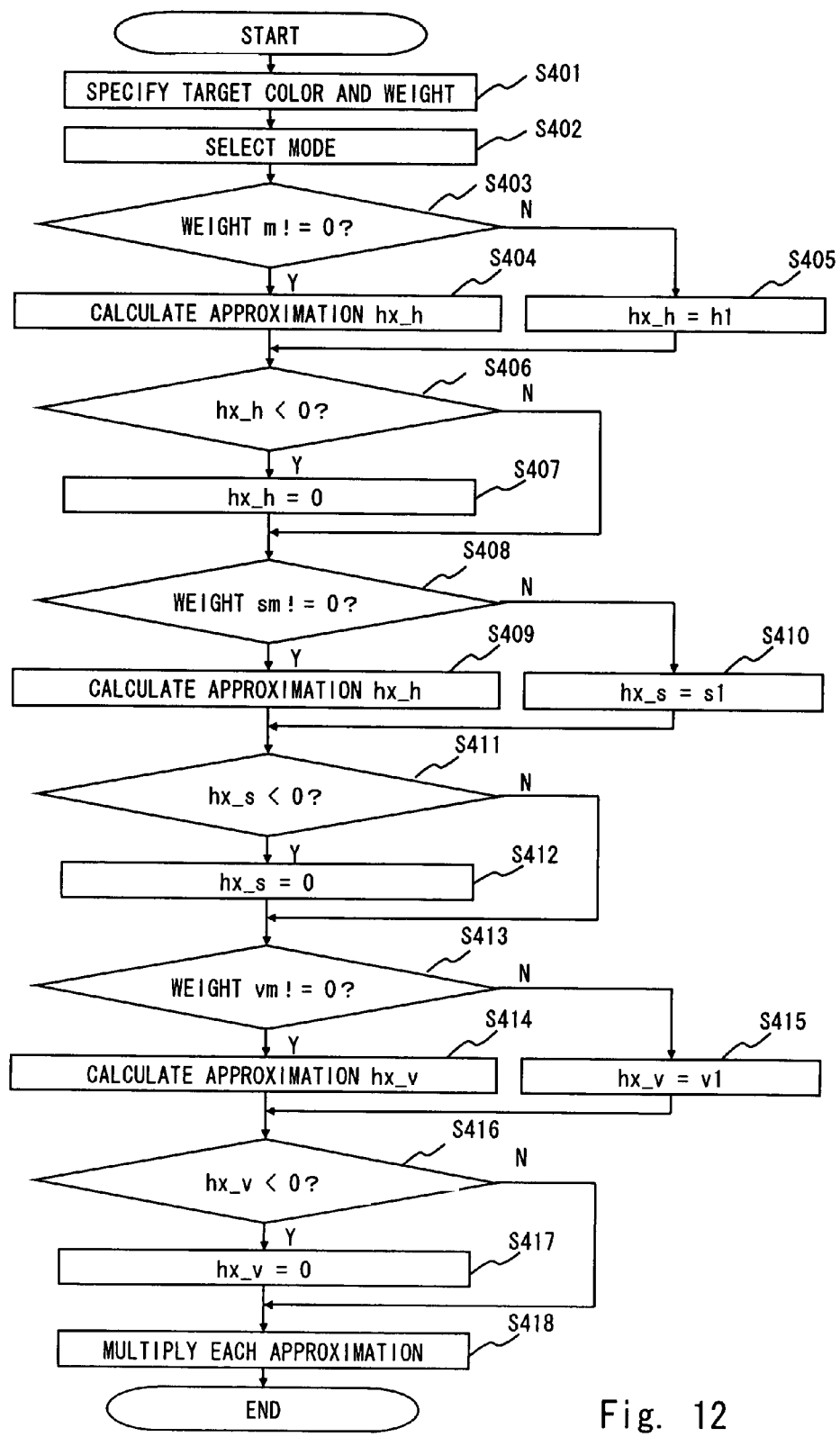
FIG. 12 is a flowchart showing the approximation calculation method according to the present invention.

FIG. 12 is a flowchart showing an approximation calculation method by the color correction apparatus of this embodiment. Firstly, the target color (Hue, Sat, Val) and weights m, sm, and vm are specified to the approximation calculator 1 (S401).

Then the selection signal "select" is input to the hue selector 56, the saturation selector 57, and the value selector 58, and the correction mode is selected (S402).

If the correction mode is the H restriction mode, the hue selector 56 selects the approximation hx_h, which is the output from the hue difference evaluator 52, and the saturation selector 57 and the value selector 58 selects 1. If the correction mode is the HSV restriction mode, the hue selector 56 selects the approximation hx_h, which is the output from the hue difference evaluator 52 and the saturation selector 57 selects the approximation hx_s, which is the output from the saturation difference evaluator 53. If the correction mode is the SV restriction mode, the hue selector 56 selects 1, the saturation selector 57 selects the approximation hx_s, which is the output from the saturation difference evaluator, and the value selector 58 selects the approximation hx_v, which is the output from the value difference evaluator 54.

Then from S403 to 407, the hue difference evaluator 52 calculates the approximation hx_h of the hue component. Specifically, the hue difference evaluator 52 evaluates whether the weight m that is specified by the approximation coefficient specifier 104 is 0 or not (S403). If the weight m is not 0, the approximation hx_h is calculated by a linear function including the weight m (S404). Specifically the approximation hx_h is calculated by the formula 4 below.

$$hx\_h = (m - |h1 - Hue|)/m \quad \text{(Formula 4)}$$

If the weight m is 0 in S403, the approximation hx_h=h1 (S405). Then the hue difference evaluator 52 evaluates whether the approximation hx_h is smaller than 0 (S406). If the approximation hx_h is smaller than 0, the approximation hx_h=0 (S407).

Then from S408 to S412, the saturation difference evaluator 53 calculates the approximation hx_s of the saturation component by the saturation difference evaluator 53. Specifically, the saturation difference evaluator 53 evaluates whether the weight sm is 0 (S407). If the weight sm is not 0, the approximation hx_s is calculated by a linear function including the weight sm (S408). Specifically the approximation hx_h is calculated by the formula 5 below.

$$hx\_s = (sm - |s1 - Sat|)/sm \quad \text{(Formula 5)}$$

If the weight sm is 0 in S407, the approximation hx_s=s1 (S410). Then the saturation difference evaluator 53 evaluates whether the approximation hx_s is smaller than 0 (S411). If the approximation hx_s is smaller than 0, the approximation hx_s=0 (S412).

Then from S413 to S417, the value difference evaluator 54 calculates the approximation hx_v of the value component by the value difference evaluator 54. Specifically, the value difference evaluator 54 evaluates whether the weight vm is 0 (S413). If the weight vm is not 0, the approximation hx_v is calculated by a linear function including the weight vm (S414). Specifically the approximation hx_v is calculated by the formula 6 below.

$$hx\_v = (vm - |v1 - Val|)/vm \quad \text{(Formula 6)}$$

If the weight vm is 0 in S413, the approximation hx_v=v1 (S415). Then the value difference evaluator 54 evaluates whether the approximation hx_v is smaller than 0 (S416). If the approximation hx_v is smaller than 0, the approximation hx_v=0 (S417).

Then the multiplier 55 multiplies the approximations hx_h, hx_s, and hx_v as in the formula 7 (S418).

$$hx = hx\_h * hx\_s * hx\_v \quad \text{(Formula 7)}$$

Specifically, in an HSV restriction mode, if the approximation hx_h of the Hue component, the approximation hx_s of the Saturation component, and the approximation hx_v of the Value components are enabled, the approximation hx can be calculated by the following formula 8.

$$Hx = (m - |h1 - Hue|)h/m * (sm - |s1 - Sat|)/sm * (vm - |v1 - Val|)/vm \quad \text{(Formula 8)}$$

Further, in an SV restriction mode, if the approximation hx_s of the Saturation component and the approximation hx_v of the Value components are enabled, the approximation hx can be calculated by the following formula 9.

$$hx = (sm - |s1 - Sat|)/sm * (vm - |v1 - Val|)/vm \quad \text{(Formula 9)}$$

Figure 17:
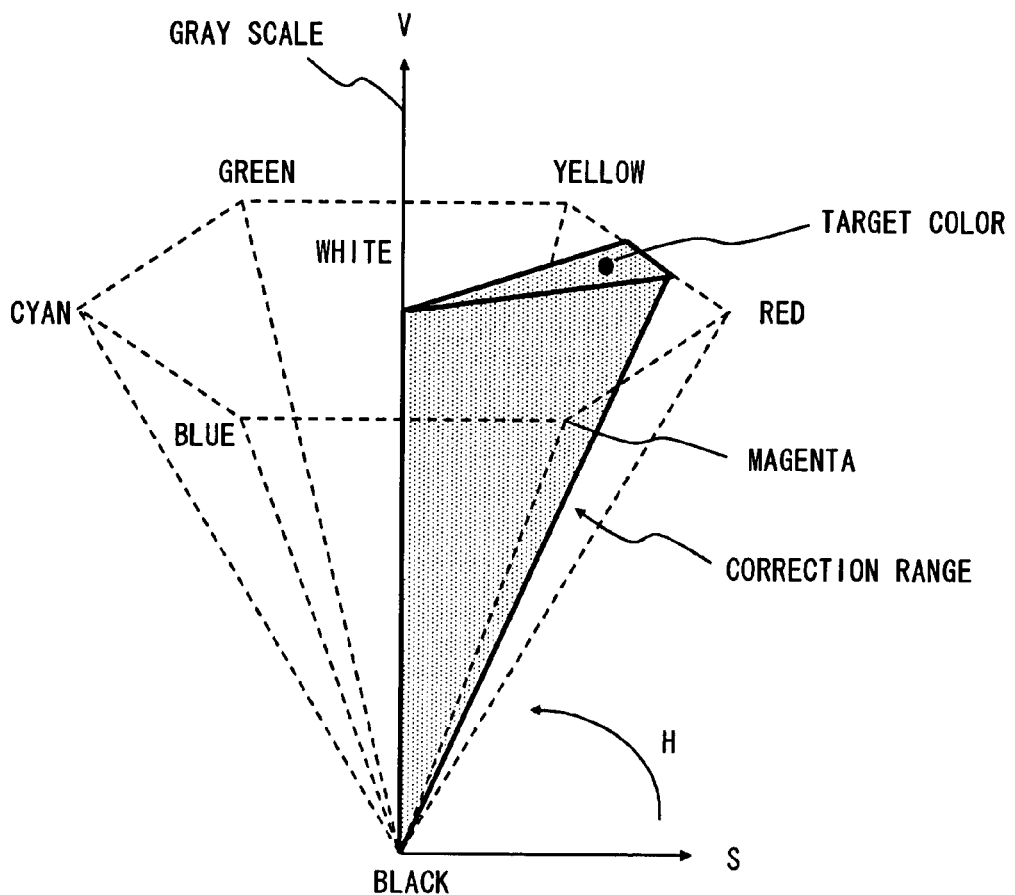
FIG. 17 is an image diagram showing an HSV color space used in a conventional approximation calculation method.

Then the correction range in the HSV color space of this embodiment is described hereinafter in detail. If the correction mode is the H restriction mode (weight m>0, approximation hx_s=1, approximation hx_v=1), only the approximation hx_h of the hue component is valid and the range of the Hue H is restricted. Thus as with the conventional example of FIG. 17, the range determined by the weight m of the Hue H, the entire Saturation S, and the entire Value V become the correction range.

Figure 18:
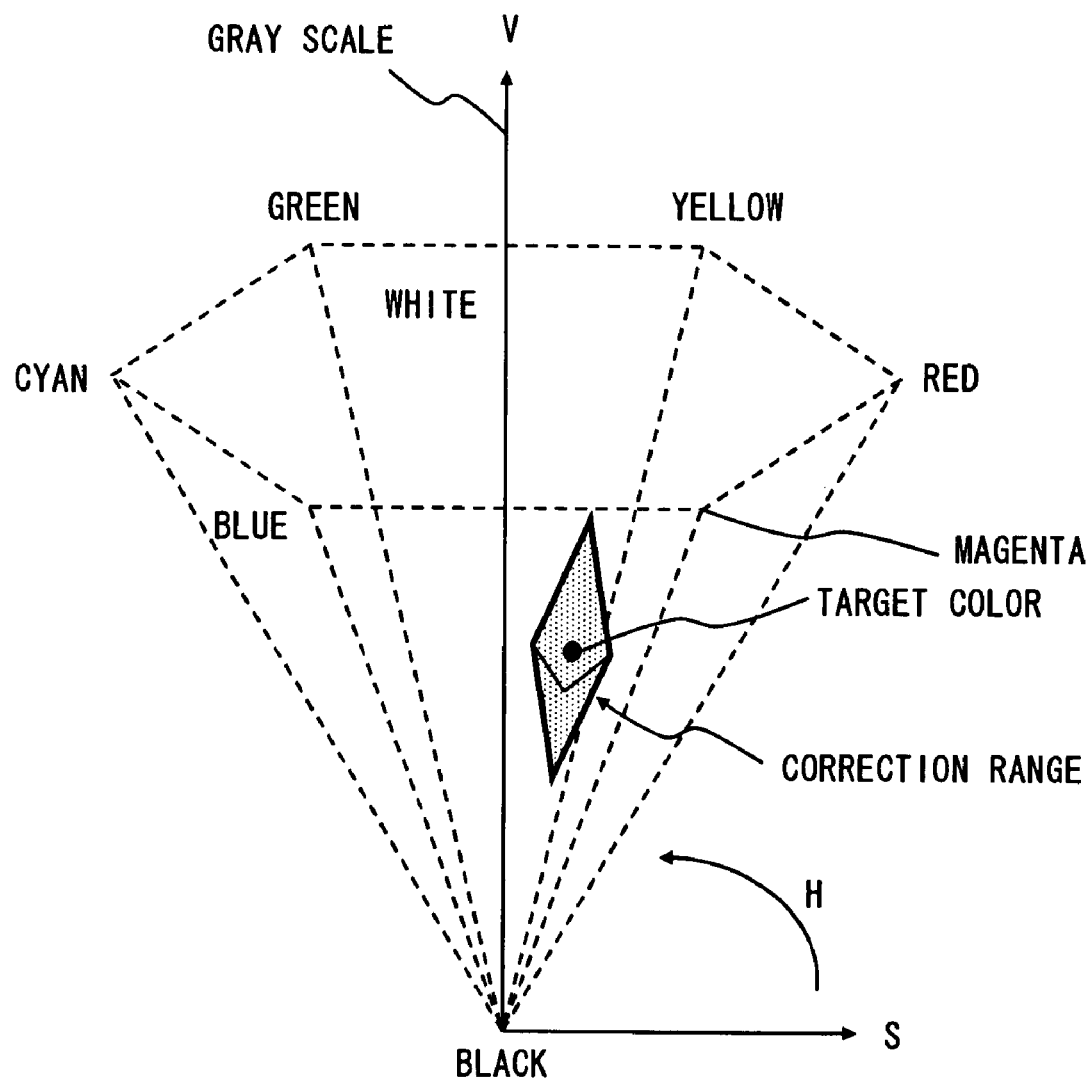
FIG. 18 is an image diagram showing the HSV color space used in the conventional approximation calculation method.

If the correction mode is the HSV restriction mode (weight m>0, weight sm>0, weight vm>0), the approximation hx_h of the hue component, the approximation hx_s of the saturation component, and the approximation hx_v of the value component are valid, and the ranges of the components of the Hue H, Saturation S, and Value V are restricted. Thus as with the conventional example of FIG. 18, the range determined by the weight m of the Hue H, range determined by the weight sm of the Saturation S, and range determined by the weight vm of Value V become the correction ranges.

If the correction mode is the SV restriction mode (approximation hx_h=1, weight sm>0, weight vm>0), the approximation hx_s of the saturation component and the approximation hx_v of the value component are valid, and the ranges for the components of the Saturation S and Value V are restricted. Thus the entire range of the Hue H, the range determined by the weight sm of the Saturation S, and the range determined by the weight vm of the Value V become the correction range. Accordingly a part of the range of the Saturation S and a part of the range of the Value V are corrected independent of the Hue.

Figure 13:
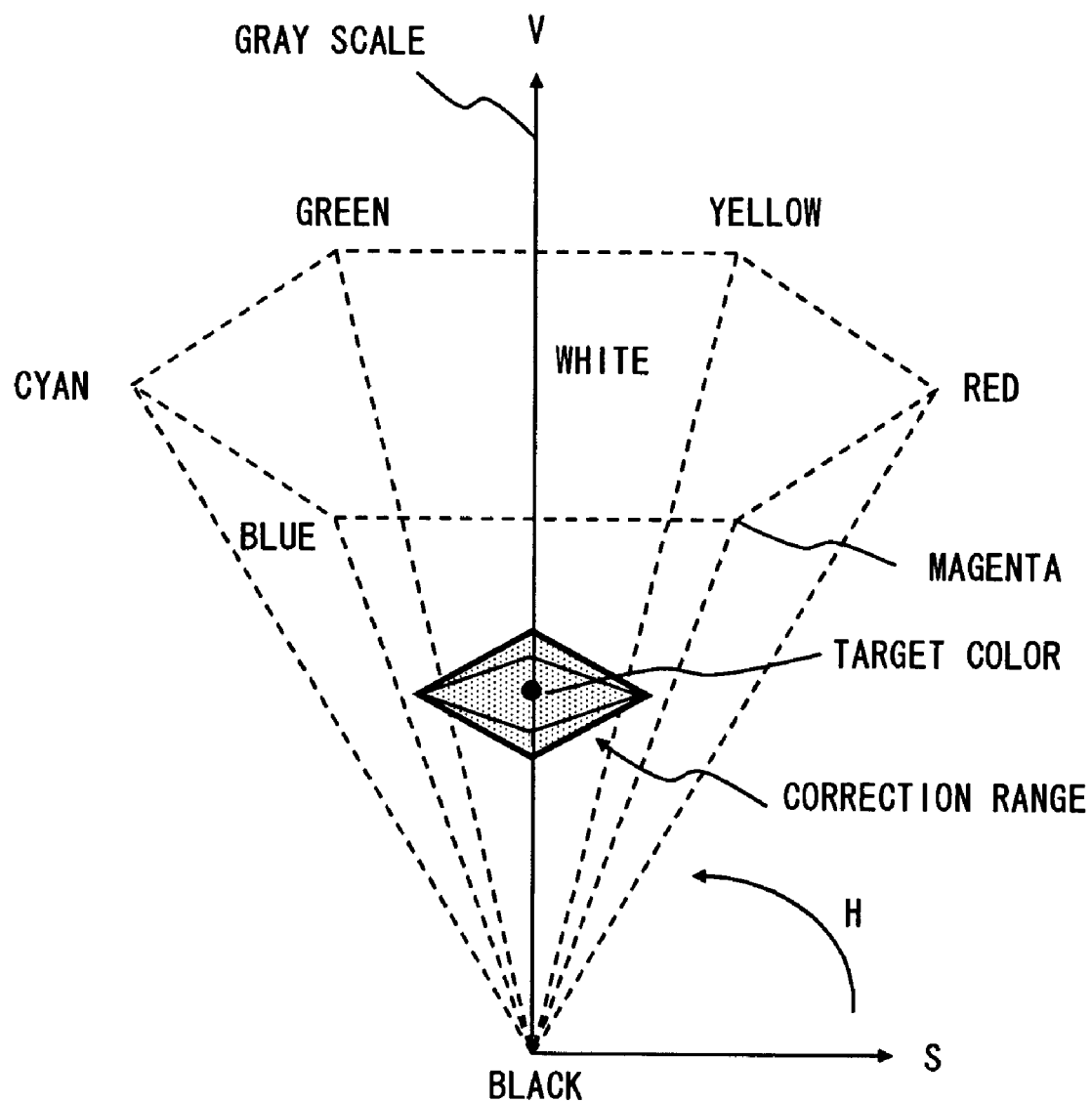
FIG. 13 is an image diagram showing an HSV color space used in the approximation calculation method according to the present invention.
Figure 14:
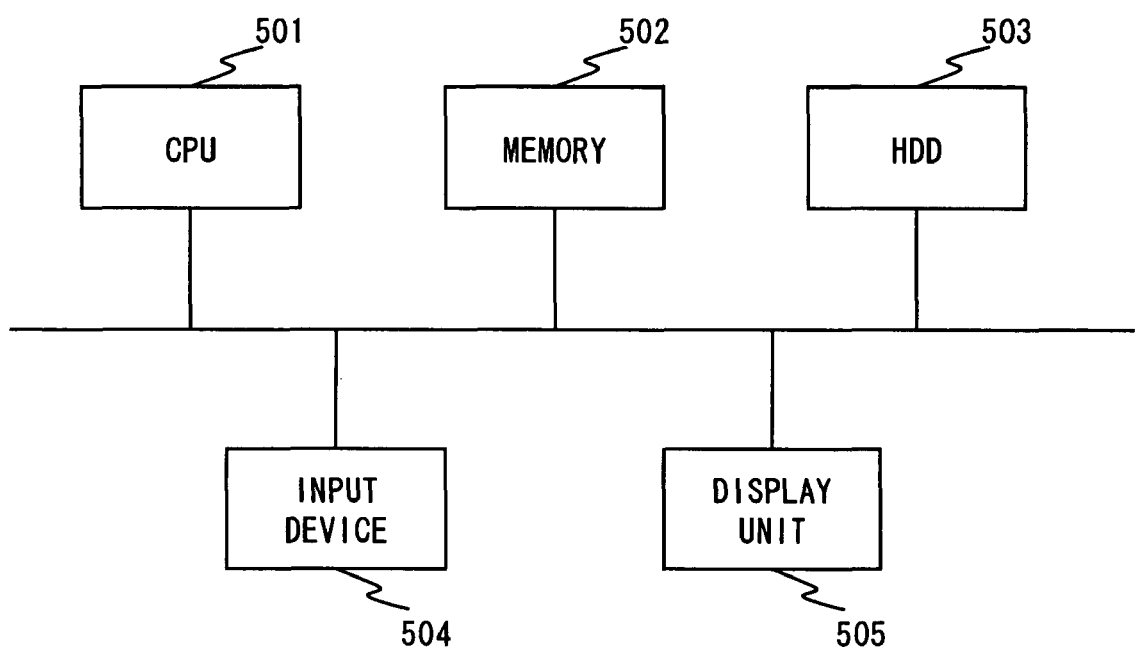
FIG. 14 is a hardware configuration diagram showing a color correction apparatus according to the present invention.
Figure 15:
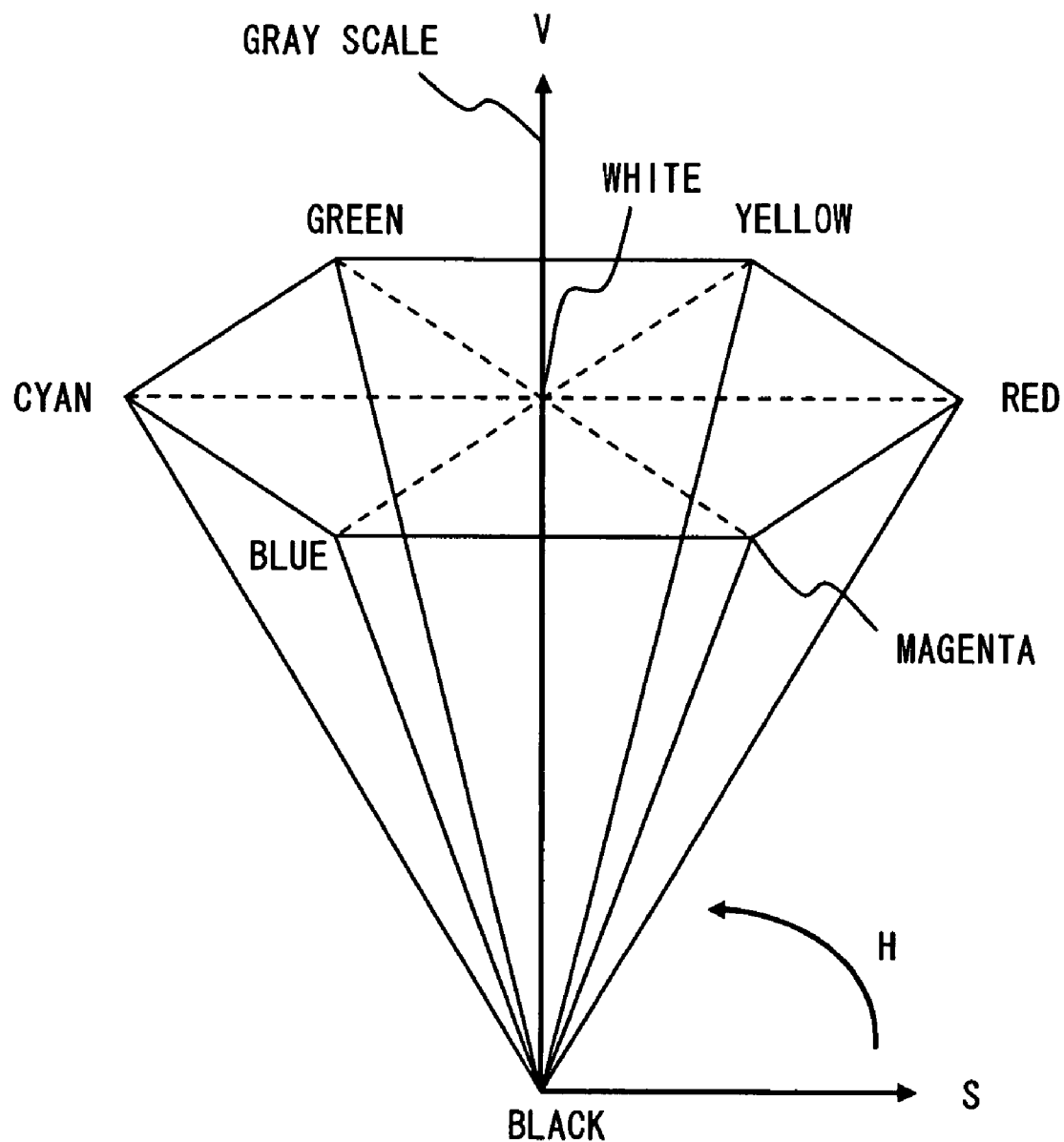
FIG. 15 is an image diagram showing a general HSV color space.
Figure 16:
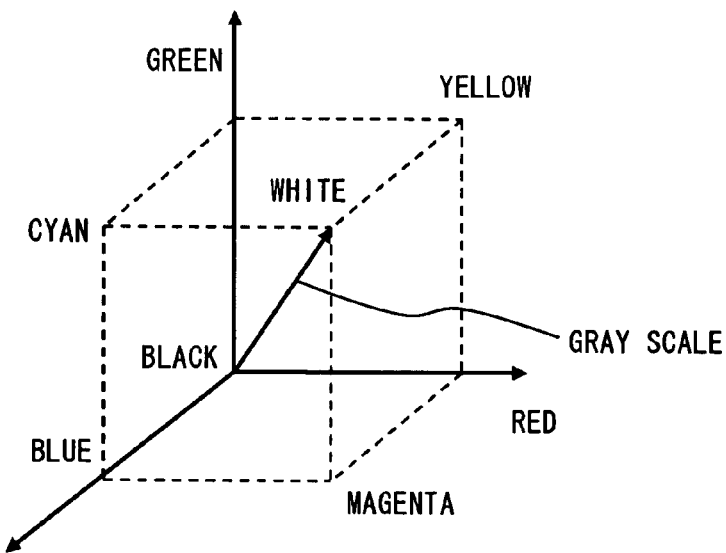
FIG. 16 is a view showing a general RGB color space.

FIG. 13 is a view showing a case in which the target color is set to a color in the grayscale in the SV restriction mode. In this case, a part of the range that is restricted in the white component direction with its center at the grayscale becomes the correction range. Accordingly, when the target color is set to a color in the grayscale, only a color having white component close to the target color can be corrected.

As described in the foregoing, in this embodiment, to calculate the approximation hx in the HSV format, by making the approximation of the Hue component invalid and the approximations of the saturation and value components valid so as to calculate the approximation hx, a color in the grayscale can be specified as the target color as well as the range restricting in the white component direction can be specified as the correction range.

Accordingly even in the HSV format, colors in the grayscale including white and black can be specified as the target color and only the necessary colors close to the target color can be corrected, as with the first embodiment.

Note that the formula used for the approximation hx of the second embodiment can be applied to each of the hue difference evaluator 52, the saturation difference evaluator 53, and the value difference evaluator 54. As described in the foregoing, even in a case in which the approximation hx is calculated in the HSV format, it is possible to reduce the correction amount near the boundary of the correction range and also to prevent from generating contouring as with the RGB format.

Other Embodiment

The color correction apparatus 100 may be configured only by hardware in a display device such as a television, or a specific means that software and hardware is cooperating in a computer such as a personal or server computer.

FIG. 21 is a view showing an example of a hardware configuration of a computer system to accomplish the color correction apparatus 100. This system includes for example a central processing unit (CPU) 501 and a storage unit 502. The CPU 501 and the storage unit 502 are connected to a hard disk drive (HDD) 503 via a bus, where the HDD 503 is an auxiliary storage unit. The system typically includes user interface hardware. As the user interface hardware, there are for example a pointing device (mouse, joy stick etc) for input, an input device 504 such as a keyboard, and a display device 505 such as a liquid crystal display for providing visual data to users. The storage device such as the HDD 503 provides an instruction to the CPU 501 or the like in corporation with an operation system to store a computer program for performing functions of the system. Specifically, the CPU 501 operates according to program deployed on the storage unit 502 and cooperates with other hardware configuration to form each block of the correction apparatus 100 including the approximation calculator 1. The approximation calculation process by the approximation calculator 1 and the color correction process by the color correction apparatus 100 are accomplished by certain programs being executed in the CPU 501. The system may be configured by a plurality of computers, not limited to a single computer.

It is apparent that the present invention is not limited to the above embodiment and it may be modified and changed without departing from the scope and spirit of the invention.

What is claimed is:

1. A color correction apparatus comprising:
   a correction unit to correct a color of an input pixel having a color included in a specified region of a color space;
   a correction range selector to select a range with a center in a grayscale to the specified region,
   wherein the correction range selector calculates an approximation, the approximation representing an approximation of the input pixel in the specified region to a target color; and
   a correction amount processor to calculate a correction amount of the input pixel according to the calculated approximation,
   wherein the color is corrected in a whole color space including the gray scale.

2. The color correction apparatus according to claim 1, wherein the color space is a RGB color space.

3. The color correction apparatus according to claim 2, wherein the correction range selector calculates the approximation according to a difference between a RGB value including a white component of the target color and a RGB value including a white component of the input pixel.

4. The color correction apparatus according to claim 3, wherein the correction range selector calculates a color distance D by following formulas 1 and 2, and calculates the approximation according to the calculated color distance D, $$(dR, dG, dB) = (r0-r, g0-g, b0-b) \quad \text{Formula 1,}$$

$$D = \max(dR, d0, dB) - \min(dR, d0, dB) \quad \text{Formula 2, and}$$

wherein (r0,g0,b0) are the RGB values of the target color, (r,g,b) are the RGB values of the input pixel, and D is a color distance on a color space between the target color and the input pixel.

5. The color correction apparatus according to claim 4, wherein the correction range selector reduces the approximation so that the approximation is reduced from inside the specified region to a boundary, the approximation being reduced to 0 at the boundary, and
   the correction range selector controls a decrease trend of the approximation at least once.

6. The color correction apparatus according to claim 3, wherein the correction range selector reduces the approximation so that the approximation is reduced from inside the specified region to a boundary, the approximation being reduced to 0 at the boundary, and
   the correction range selector controls a decrease trend of the approximation at least Once.

7. The color correction apparatus according to claim 3, wherein the correction range selector calculates a color distance D according to the RGB values of the target color and the RGB values of the input pixel to provide the color distance D on a color space between the target color and the input pixel.

8. The color correction apparatus according to claim 7, wherein the correction range selector calculates the approximation according to the calculated color distance.

9. The color correction apparatus according to claim 2, wherein the correction range selector reduces the approximation so that the approximation is reduced from inside the specified region to a boundary, the approximation being reduced to 0 at the boundary, and
   the correction range selector controls a decrease trend of the approximation at least once.

10. The color correction apparatus according to claim 1, wherein the correction range selector comprises:
    a hue approximation calculator to calculate an approximation of an hue component of the input pixel;
    a saturation approximation calculator to calculate an approximation of a saturation component of the input pixel;
    a value approximation calculator to calculate an approximation of a value component of the input pixel; and
    a multiplier to calculate the approximation by multiplying a valid value among the approximation of the hue component, the approximation of the saturation component, and the approximation of the value component,
    wherein the correction range selector sets the approximation of the hue component to invalid, the approximation of the saturation component to valid, and the approximation of the value component to valid.

11. The color correction apparatus according to claim 10, wherein the correction range selector calculates the approximation by a following formula 3, $$hx = (sm - |s1 - Sat1|)/sm * (vm - |v1 - Va1|)/vm \quad \text{Formula 3, and}$$

wherein (Hue,Sat,Val) are the HSV values of the target color, (h1,s1,v1) are HSV values of the input pixel, sm is a weight coefficient to define a restriction of a saturation component, vm is a weight coefficient to define a restriction of a value component, and hx is the approximation.

12. The color correction apparatus according to claim 11, wherein the correction range selector reduces the approximation so that the approximation is reduced from inside the specified region to a boundary, the approximation being reduced to 0 at the boundary, and the correction range selector controls a decrease trend of the approximation at least once.

13. The color correction apparatus according to claim 10, wherein the correction range selector reduces the approximation so that the approximation is reduced from inside the specified region to a boundary, the approximation being reduced to 0 at the boundary, and
the correction range selector controls a decrease trend of the approximation at least once.

14. The color correction apparatus according to claim 1, wherein the correction range selector reduces the approximation so that the approximation is reduced from inside the specified region to a boundary, the approximation being reduced to 0 at the boundary, and
the correction range selector controls a decrease trend of the approximation at least once.

15. The color correction apparatus according to claim 1, wherein, the correction amount processor changes the amount of color correction in an order of a color aligned from inside the specified region toward the boundary.

16. The color correction apparatus according to claim 1, wherein the correction amount processor reduces the correction amount such that it is reduced to zero at the boundary of the correction range according to the color distance from a target color, which is the center of the correction region.

17. The color correction apparatus according to claim 1, wherein any color in the whole color space including the gray scale is corrected, and
wherein a part of a region in a white component direction is set as the range by the correction range selector.

18. A method for color correction, the method comprising:
selecting, by a correction range selector, a region having a center in a grayscale as a specified region of a color space; and
correcting a color of an input pixel having a color included in the specified region of a color space,
wherein the correction range selector calculates an approximation, the approximation representing an approximation of the input pixel in the specified region to a target color, and
wherein there is further comprised a correction amount processor to calculate a correction amount of the input pixel according to the calculated approximation,
wherein the color is corrected in a whole color space including the gray scale.

19. The method according to claim 18, wherein:
the color space comprises a RGB color space,
the correction range selector calculates the approximation according to a difference between a RGB value including a white component of the target color and a RGB value including a white component of the input pixel,
the correction range selector calculates the color distance D by following formulas 1 and 2, and calculates the approximation according to the calculated color distance D, $(dR,dG,dB)=(r0-r,g0-g,b0-b)$ Formula 1, $D=\max(dR,dG,dB)-\min(dR,dG,dB)$ Formula 2, and the (r0,g0,b0) are the RGB values of the target color, (r,g,b) are the RGB values of the input pixel, and D is a color distance on a color space between the target color and the input pixel.

20. A program product, stored on a tangible non-transitory computer readable medium, to execute a color correction process by a computer, the program product comprising:
selecting a region having a center in a grayscale as a specified region of a color space; and
correcting a color of an input pixel having a color included in the specified region of the color space,
wherein correcting the color of the input pixel comprising:
calculating an approximation, the approximation representing an approximation of the input pixel in the specified region to a target color, and
calculating a correction amount of the input pixel according to the calculated approximation,
wherein the color is corrected in a whole color space including the gray scale.

21. The program product according to claim 20, wherein:
the color space comprises an RGB color space,
the selecting the region includes calculating the approximation according to a difference between a RGB value including a white component of the target color and a RGB value including a white component of the input pixel,
the selecting the region includes calculating the color distance D by following formulas 1 and 2, and calculates the approximation according to the calculated color distance D, $(dR,dG,dB)=(r0-r,g0-g,b0-b)$ Formula 1, $D=\max(dR,dG,dB)-\min(dR,dG,dB)$ Formula 2, and the (r0,g0,b0) are the RGB values of the target color, (r,g,b) are the RGB values of the input pixel, and D is a color distance on a color space between the target color and the input pixel.

* * * * *